(12) United States Patent
Jameson

(10) Patent No.: US 7,409,376 B2
(45) Date of Patent: *Aug. 5, 2008

(54) COLLECTION CONTENT CLASSIFIER

(75) Inventor: Kevin Wade Jameson, Calgary (CA)

(73) Assignee: Coverity, Inc., San Francisco, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 11/129,679

(22) Filed: May 13, 2005

(65) Prior Publication Data

US 2005/0273398 A1 Dec. 8, 2005

Related U.S. Application Data

(63) Continuation of application No. 09/885,076, filed on Jun. 21, 2001, now Pat. No. 6,934,694.

(51) Int. Cl.
*G06F 17/00* (2006.01)
*G06N 5/00* (2006.01)
*G06N 5/02* (2006.01)

(52) U.S. Cl. .......................................... 706/45; 706/46
(58) Field of Classification Search ....................... None
See application file for complete search history.

(56) References Cited

U.S. PATENT DOCUMENTS

| | | | | |
|---|---|---|---|---|
| 4,757,456 A * | 7/1988 | Benghiat | ..................... | 705/412 |
| 4,816,653 A * | 3/1989 | Anderl et al. | ................ | 235/380 |
| 4,989,132 A * | 1/1991 | Mellender et al. | ........... | 717/139 |
| 5,185,887 A * | 2/1993 | Takahashi et al. | ........... | 707/203 |
| 5,694,546 A * | 12/1997 | Reisman | ....................... | 705/26 |
| 5,758,347 A * | 5/1998 | Lo et al. | ................. | 707/103 R |
| 5,857,207 A * | 1/1999 | Lo et al. | ..................... | 707/203 |
| 5,870,764 A * | 2/1999 | Lo et al. | ..................... | 707/203 |
| 5,884,301 A * | 3/1999 | Takano | .......................... | 707/3 |
| 5,903,889 A * | 5/1999 | de la Huerga et al. | ........... | 707/3 |
| 5,923,877 A * | 7/1999 | Berner et al. | ................ | 717/108 |
| 5,978,804 A * | 11/1999 | Dietzman | ..................... | 707/10 |
| 6,029,175 A * | 2/2000 | Chow et al. | .............. | 707/104.1 |
| 6,308,171 B1 * | 10/2001 | De La Huerga | ................ | 707/3 |
| 6,418,452 B1 * | 7/2002 | Kraft et al. | ................... | 707/200 |
| 6,418,453 B1 * | 7/2002 | Kraft et al. | ................... | 707/200 |

(Continued)

OTHER PUBLICATIONS

Semi-automatic, data-driven construction of multimedia ontologies Jaimes, A.; Smith, J.R.; Multimedia and Expo, 2003. ICME '03. Proceedings. 2003 International Conference on vol. 1, Jul. 6-9, 2003 pp. I-781-4 vol. 1 Digital Object Identifier 10.1109/ICME.2003. 1221034.*

(Continued)

*Primary Examiner*—Micheal B Holmes
(74) *Attorney, Agent, or Firm*—Manatt, Phelps + Phillips LLP

(57) ABSTRACT

Collection content classifiers classify computer files and other collection content in accordance with predetermined classification specifications. In operation, collection content classifiers dynamically discover collection content members, assign data types to content members, associate symbolic actions with content members, determine processing dependencies among content members, and return organized classification information to calling programs for subsequent use in processing content members. Collection content classifiers thereby improve the productivity of human knowledge workers by enabling the construction of smart, collection-aware application programs that can perform more extensive, more complex, and more automated collection processing operations than were previously possible.

24 Claims, 25 Drawing Sheets

U.S. PATENT DOCUMENTS

| | | | |
|---|---|---|---|
| 6,675,379 B1 * | 1/2004 | Kolodner et al. | 717/155 |
| 6,721,865 B2 * | 4/2004 | Lewis | 711/170 |
| 6,741,996 B1 * | 5/2004 | Brechner et al. | 707/102 |
| 6,920,541 B2 * | 7/2005 | Kolodner et al. | 711/170 |
| 6,928,442 B2 * | 8/2005 | Farber et al. | 707/10 |
| 6,944,662 B2 * | 9/2005 | Devine et al. | 709/225 |
| 7,013,298 B1 * | 3/2006 | De La Huerga | 707/3 |
| 7,058,704 B1 * | 6/2006 | Mangipudi et al. | 709/223 |
| 7,117,532 B1 * | 10/2006 | Lyle et al. | 726/23 |

OTHER PUBLICATIONS

Using the Fisher kernel method for Web audio classification Moreno, P.J.; Rifkin, R.; Acoustics, Speech, and Signal Processing, 2000. ICASSP '00 Proceedings. 2000 IEEE International Conference on vol. 6, Jun. 5-9, 2000 pp. 2417-2420 vol. 4 Digital Object Identifier 10.1109/ICASSP.2000.859329.*

* cited by examiner

FIG. 1
PRIOR ART
```
1    c:\collections
2        notes.txt
3        myletter.doc
4        c-myhomepage
5
6           s
7              homepage.html
8              myphoto.jpg
```
FIG. 2
```
1    c:\collections
2        notes.txt
3        myletter.doc
```
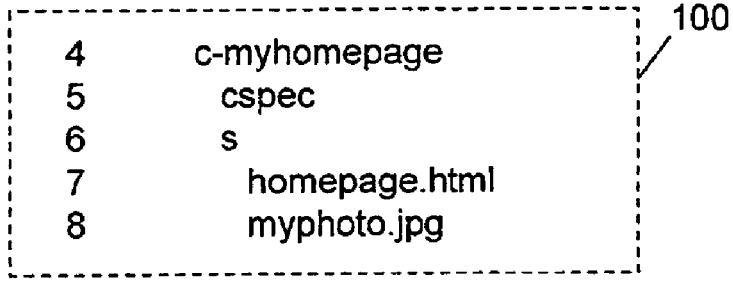
```
4        c-myhomepage
5           cspec
6           s
7              homepage.html
8              myphoto.jpg
```
FIG. 3
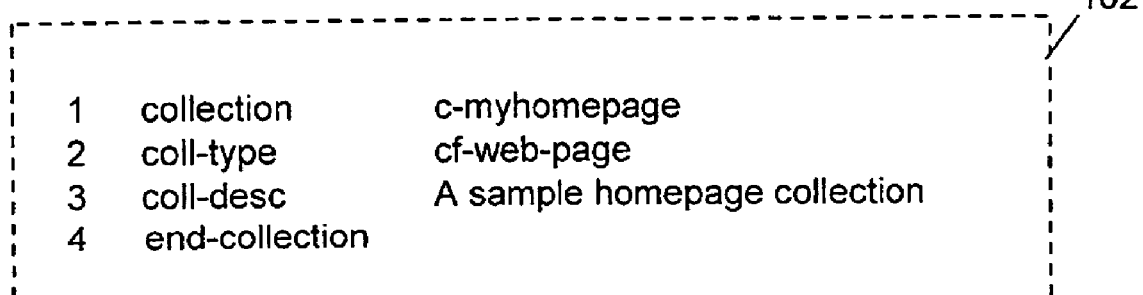
```
1   collection      c-myhomepage
2   coll-type       cf-web-page
3   coll-desc       A sample homepage collection
4   end-collection
```

FIG. 8

```
1   /* collection data structure */
2   collection-info {

3     + specifier_info
4         + coll-type-indicator
5         + other specifier information ...

6     + content_info
7         + content_location_info ...
8         + content_members ...
9         + other content information...

10    + other collection structure information...
11  }
```

FIG. 9

```
1   /* collection type definition data structure */
2   collection-type-definition-info {

3     + coll-type-name
4     + collection internal structure info ...
5     + collection content location info ...
6     + collection content type recognition info ...

7     + other collection type definition information...
8   }
```

FIG. 10

| KEY | VALUE |
|---|---|

1  /* collection type internal structure definitions */
2  dir_source_files     ./s
3  dir_doc_files        ./doc 4  /* content location definitions (per-type content links) */
5  content_subtree_http    http://host.com/some/dir/name
6  content_subtree_ftp     ftp://host.com/some/dir/name
7  content_subtree_nfs     /some/local/directory/name 8  /* content type recognition definitions */
9  content_policy       subtree_below_cspec_file
10 content_file_type    .c      file_cpp
11 content_file_type    .c      file_c
12 content_file_type    .h      file_c_include
13 content_file_type    .doc    file_ms_word
14 content_file_type    .html   file_html
15 content_file_type    .xls    file_ms_excel 16 /* collection processing definitions */
17 compile_c_files      yes
18 compiler_windows     vc++
19 compiler_unix        gcc
20 build platforms      Win98, Win2000, gnulinux
21 process files        compile link
22 link libraries       stdio math sock 23 /* results dispatching definitions */
24 results_ftp_host     ftp.output.com
25 results_ftp_dir      c:\ftphome\collection\results 1  /* simplified algorithm for classifier-enabled program*/

2  Call get runtime info to get collection to classify

3  Call collection content classifier to classify collection content

4  Call application processing functions to process the collection, using the content classification information produced in step 3.

FIG. 14

1  /* simplified algorithm for classifier manager module */
2  Build data structures
3  Obtain runtime info including a collection to classify 4  Obtain lists of collection products and product contents
5  Assign a content type to each content member
6  Assign a symbolic action to each content member
7  Calculate dependencies for each content member 8  Organize and output information
9  Return classifier data structures to caller

FIG. 15

1  /* top-level classified-content data structure */
2  coll-class-content {

3  /* classification info for this collection instance */
4      + collection type indicator
5      ... other collection info 6  /* classification info for this collection's products */
7      + list of prod-class-content structures
8          + list of content-class-entry structures 9  /* type definition info to support classification ops */
10     + collection type definition information
11         + product type definition information
12             + file type identification information
13                 + content type definition information
14                     + action type definition information

| | | |
|---|---|---|
| 1 | collection type definition information | |
| 2 | product type definition information | |
| 3 | content type definition information | |
| 4 | action type definition information | |

| | | |
|---|---|---|
| 5 | cspec: | |
| 6 | coll-type | ct-program |
| | | |
| 7 | index-coll-types.tbl: | |
| 8 | ct-program | ct-program.def |
| 9 | ct-web-page | ct-web-page.def |
| | | |
| 10 | ct-program.def: | |
| 11 | product-type-index | index-product-types.tbl |
| | | |
| 12 | index-product-types.tbl: | |
| 13 | pt-program | pt-program.def |
| | | |
| 14 | pt-program.def: | |
| 15 | content-type-index | index-content-types.tbl |
| | | |
| 16 | index-content-types.tbl | |
| 17 | content-c | content-c.def |
| | | |
| 18 | content-c.def: | |
| 19 | action-type-index | index-action-types.tbl |
| | | |
| 20 | index-action-types.tbl: | |
| 21 | action-c | action-c.def |
| | | |
| 22 | action-c.def: | |
| 23 | parser-type | internal |
| 24 | parser-name | internal-c |

FIG. 18

```
1   /* simplified algorithm for get coll membership info manager */
2   Build data structures 3   /* Obtain collection specifier info including coll product list */
4   Call Get Collection Specifier Info
5       Call Collection Information Manager 6   /* Obtain type definition info for coll type, product type, etc */
7   Call Get Collection Product Dir Type Information
8       Call Get Collection Type Definition Information
9       Call Get Product Type Definition Information
10      Call Get Product Source Directory Definition Information 11  /* Build per-product content lists from per-product src dir lists */
12  For each product:
13      Call Get Platform Source Directory List
14      Call Search Source Dirs to find content files in the source dirs
15      Add found content files to content-entry data structures 16  Return completed prod-class-content list data struct to caller
```

FIG. 19

```
1   /* prod-class-content data structure for one product */
2   prod-class-content {

3       + product type indicator
4       + list of product actions
5       + list of content-class-entry data structures 6       ... other product information
7   }
```

FIG. 20

```
1   /* content-class-entry data struct for one content entry */
2   content-class-entry {

3       + content entry pathname
4       + content type indicator
5       + content language type indicator
6       + content action indicator
7       + list of content dependencies
8       + ...

```
1   index-coll-types.tbl:
2   ct-program              ct-program.def
3   ct-library              ct-library.def
4   ct-doc-html             ct-html.def 5   ct-program.def:
6   /* type definition info for a "ct-program" collection type */
7   product-type-index      index-prod-program.tbl
8   action-type-index       index-coll-action-types.tbl
9   action                  cleanup
10  action                  checkin
11  ... other collection type info
```

FIG. 22

```
1   index-prod-program.tbl:
2   pt-program              pt-program.def
3   pt-program-java         pt-program-java.def
4   pt-program-unix         pt-program-unix.def
5   pt-program-win          pt-program-win.def 6   pt-program.def:
7   /* type definition info for a "program" product type */
8   dir-source-files        source-dirs.lst
9   dir-library-files       library-dirs.lst
10  file-identification-table   file-identification.tbl
11  content-type-index      index-content-types.tbl
12  action-type-index       index-prod-action-types.tbl
13  action                  link
14  ... other product type info
```

FIG. 23

| | | |
|---|---|---|
| 1 | source-dirs.lst: | |
| 2 | dir/gnulinux2 | ../s/gnulinux2 |
| 3 | dir/gnulinux2 | ../s/gnulinux |
| 4 | dir/gnulinux2 | ../s/unix |
| 5 | dir/gnulinux2 | ../s/pi |
| 6 | dir/gnulinux2 | ../s |
| 7 | dir/win98 | ../s/win98 |
| 8 | dir/win98 | ../s/win |
| 9 | dir/win98 | ../s/pi |
| 10 | dir/win98 | ../s |
| 11 | dir/win95 | ../s/win95 |
| 12 | dir/win95 | ../s/win |
| 13 | dir/win95 | ../s/pi |
| 14 | dir/win95 | ../s |

FIG. 24

| | | |
|---|---|---|
| 1 | library-dirs.lst: | |
| 2 | dir/gnulinux2 | ../lib/gnulinux2 |
| 3 | dir/gnulinux2 | ../lib/gnulinux |
| 4 | dir/gnulinux2 | ../lib/unix |
| 5 | dir/gnulinux2 | ../lib/pi |
| 6 | dir/gnulinux2 | ../lib |
| 7 | dir/win98 | ../lib/win98 |
| 8 | dir/win98 | ../lib/win |
| 9 | dir/win98 | ../lib/pi |
| 10 | dir/win98 | ../lib |

FIG. 25

| | |
|---|---|
| 1 | c:\collections |
| 2 |     c-mystuff |
| 3 |         cspec |
| 4 |             s |
| 5 |                 pi |
| 6 |                     file1.h |
| 7 |                     file1.c |
| 8 |                 win |
| 9 |                     file2-pd.h |
| 10 |                     file2-pd.c |
| 11 |                 win98 |
| 12 |                     file2-pd.c |
| 13 |                 unix |
| 14 |                     file2-pd.h |
| 15 |                     file2-pd.c |
| 16 |                 gnulinux2 |
| 17 |                     file2-pd.c |
| 18 |             lib |
| 19 |                 pi |
| 20 |                     libfuns.c |
| 21 |                     libfuns2.c |
| 22 |                 win |
| 23 |                     libfuns.h |
| 24 |                     libfuns2.c |
| 25 |                 unix |
| 26 |                     libfuns.h |
| 27 |         win98.plt |
| 28 |             ... compiled files, programs, libs, etc |
| 29 |         gnulinux2.plt |
| 30 |             ... compiled files, programs, libs, etc |

FIG. 26

```
1   /* file list for win98 platform */
2   ../s/win98/file2-pd.c
3   ../s/win/file2-pd.h
4   ../s/pi/file1.h
5   ../s/pi/file1.c
6   ../lib/win/libfuns.h
7   ../lib/win/libfuns2.c
8   ../lib/pi/libfuns.c 9   /* file list for gnulinux2 platform */
10  ../s/gnulinux2/file2-pd.c
11  ../s/unix/file2-pd.h
12  ../s/pi/file1.h
13  ../s/pi/file1.c
14  ../lib/unix/libfuns.h
15  ../lib/unix/libfuns2.c
16  ../lib/pi/libfuns.c
```

FIG. 27

```
1   collection        c-my-example
2   coll-type         ct-program
3   coll-desc         A memdir and memfile example.
4   end-collection 5   product           myprog
6   prod-type         pt-program
7   memdir            c:\third-party\source-files
8   memdir-prepend    c:\search\this\dir\first
9   memdir-append     c:\search\this\dir\last
10  memfile           c:\third-party\product\somefile.obj
11  memfile-prepend   c:\somewhere\file.c
12  memfile-append    c:\somewhere\file2.c
13  end-product
```

FIG. 28

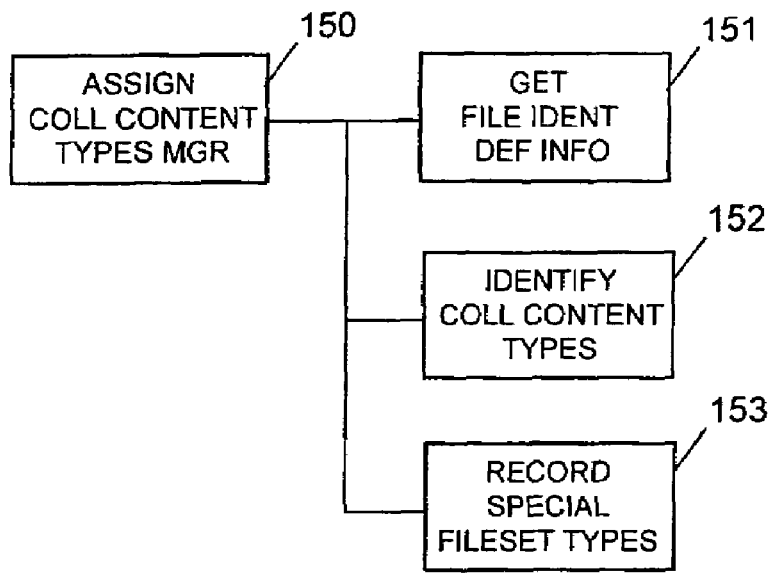

FIG. 29

```
1   /* simplified algorithm for assign content type manager */
2   Build data structures 3   /* Obtain file identification criteria to enable matching */
4   Call Get File Identification Definition Information 5   /* Identify the content types of all files in the content list */
6   For each product in collection product list:
7       For each file in current product content list:
8           Call Identify Content Type to assign a content type 9   /* Record special fileset types */
10  Call Record Special Fileset Types 11  Return data structures to caller
```

FIG. 30

| | | | |
|---|---|---|---|
| 1 | file-identification.tbl: | | |
| 2 | /* Match-type | Match-string | Content-type */ |
| 3 | exact | junkfile | ignore |
| 4 | suffix | .bak | ignore |
| 5 | tail | ~ | ignore |
| 6 | content | #!/bin/csh | csh |
| 7 | suffix | .c | c-source |
| 8 | suffix | .h | c-header |
| 9 | suffix | .C | c++ |
| 10 | suffix | .c++ | c++ |

FIG. 31

| | | |
|---|---|---|
| 1 | collection | c-my-example |
| 2 | coll-type | ct-program |
| 3 | coll-desc | A fileset example. |
| 4 | end-collection | |
| 5 | product | myprog |
| 6 | prod-type | pt-program |
| 7 | fileset | myset ../s/file1.f ../s/file2.f |
| 8 | fileset | myset ../s/file3.f |
| 9 | fileset-type | myset content-no-optimize |
| 10 | end-product | |

FIG. 32

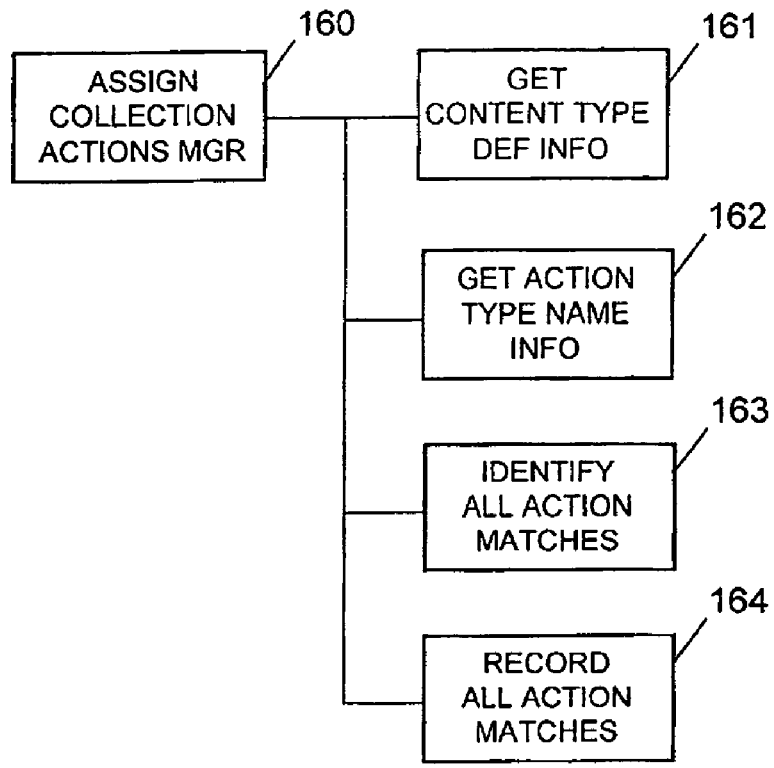

FIG. 33

```
1  /* simplified algorithm for assign content actions manager */
2  Build data structures 3  /* Obtain file type definition and action name index info */
4  Get File Type Definition Information
5  Get Action Type Name Information 6  /* Assign action names to collection, product, and content entries */
7  Call Identify All Action Matches to choose coll, prod, content actions
8  Call Record All Action Matches to record choices in data structures 9  Return completed data structures to caller
```

FIG. 34

| | | |
|---|---|---|
| 1 | index-content-types.tbl: | |
| 2 | c-source | content-c.def |
| 3 | c-header | content-c-h.def |
| 4 | csh | content-csh.def |
| 5 | html | content-html.def |
| | | |
| 6 | content-c.def: | |
| 7 | /* type definition info for a "c" file type */ | |
| 8 | type | c-source |
| 9 | language | c |
| 10 | action | action-c-source |
| 11 | action-type-index | index-action-types.tbl |
| 12 | ... other content type definition info | |

FIG. 35

| | | |
|---|---|---|
| 1 | index-action-types.tbl: | |
| 2 | action-c-source | action-c-source.def |
| 3 | action-c-header | action-c-header.def |
| 4 | action-csh | action-csh.def |
| 5 | action-html | action-html.def |
| | | |
| 6 | action-c-source.def: | |
| 7 | parser-type | internal |
| 8 | parser-name | internal-c |

FIG. 36

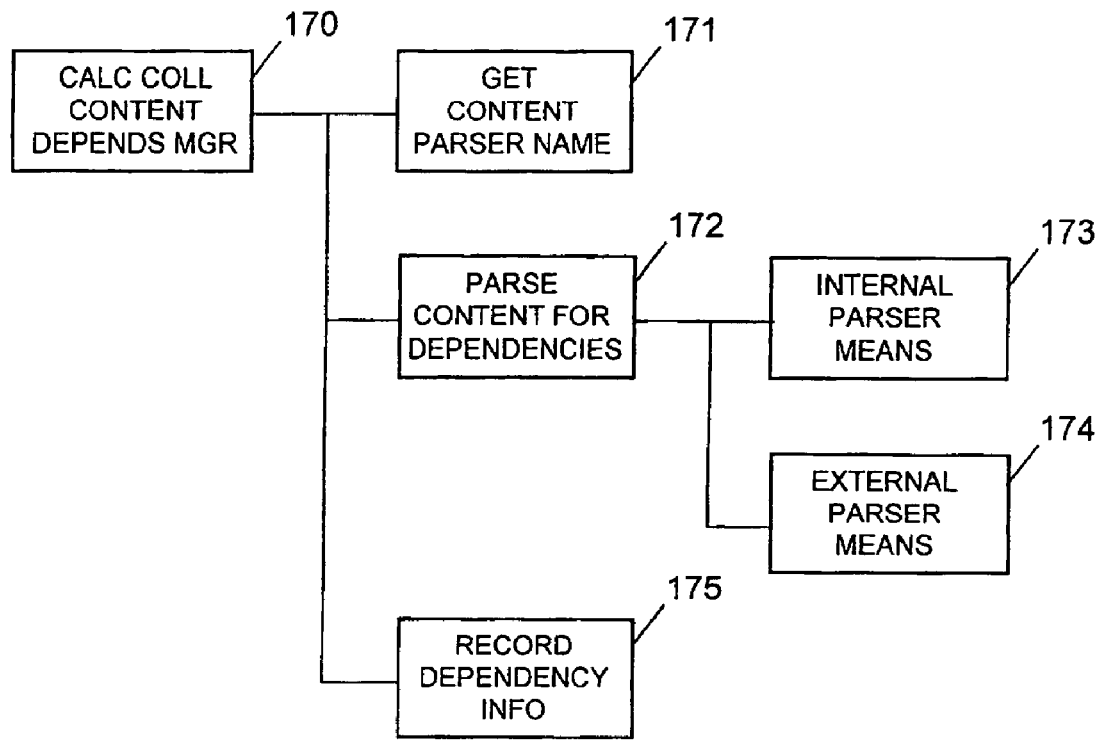

FIG. 37

```
1  /* simplified algorithm for calc content dependencies mgr */
2  Build data structures 3  /* loop over and parse all content entries */
4  For each product in collection product list:
5      For each file in current product content list:
6          Call Get Content Parser to choose a parser
7          Call Parse For Dependencies to obtain dependencies
8          Call Record Dependency Info to store dependencies in
                content-class-entry data structure 9  Return completed content-class-entry data structures to caller
```

FIG. 38

```
1    /* external parser invocation command line */
2    new-language-parser  infile outfile
3    new-language-parser  file1.c file1.c.deps 4    file1.c.deps:
5    /* dependency info from new-language-parser */
6       dep    file1.c     stdio.h
7       dep    file1.c     app-data.h
8       dep    file1.c     content-class-entry.h
```

FIG. 39

```
1   c:\collections
2       c-my-example
3           cspec
4           s
5               pi
6                   cmdline.h
7               win98
8                   cmdline.c
9               gnulinux2
10                  cmdline.c
11          lib
12              pi
13                  libfuns.h
14                  libfuns.c
```

FIG. 40

```
1   cspec:

2   collection   c-my-example
3   coll-type    ct-program
4   coll-desc    A multi-platform C program with library.
5   end-collection 6   product      myprog
7   prod-type    pt-program
8   prod-desc    A program product.
9   end-product 10  product      mylibrary
11  prod-type    pt-library
12  prod-desc    A library product.
13  end-product
```

FIG. 41

```
1    /* classification output for win98 platform */
2    collection            c-my-example
3    coll-type             ct-program
4    coll-action           cleanup
5    coll-action           checkin
6    ... other coll class info 7    /* classification info for a program product */
8    product               myprog
9    prod-type             pt-program
10   prod-action           link 11   content               cmdline.h
12   content-path          ../s/pi/cmdline.h
13   content-type          c-header
14   content-language      c
15   content-action        none
16   end-content 17   content               cmdline.c
18   content-path          ../s/win/cmdline.c
19   content-type          c-source
20   content-language      c
21   content-action        action-c-source
22   content-dep           ../s/pi/cmdline.h
23   content-dep           ../lib/pi/libfuns.h
24   end-content 25   end-product
```

FIG. 42

```
1    /* classification output */
2    collection              c-my-example

3    ...  /* classification info for the host collection */
4    ...  /* classification info for the program product */

5    /* classification info for a library product */
6    product                 mylibrary
7    prod-type               pt-library
8    prod-action             archive
9    prod-action             export-lib-for-sharing 10   content                 libfuns.h
11   content-path            ../lib/pi/libfuns.h
12   content-type            c-header
13   content-language        c
14   content-action          export-incl-for-sharing
15   end-content 16   content                 libfuns.c
17   content-path            ../lib/pi/cmdline.c
18   content-type            c-source
19   content-language        c
20   content-action          action-c-source
21   content-dep             ../lib/pi/libfuns.h
22   end-content 23   end-product
```

COLLECTION CONTENT CLASSIFIER

CROSS REFERENCES TO RELATED APPLICATIONS

This application is a continuation of U.S. Patent application Ser. No. 09/885,076, now U.S. Pat. No. 6,934,694, entitled "COLLECTION CONTENT CLASSIFIER," filed Jun. 21, 2001 which is incorporated herein by reference for all purposes.

This application is related is related to U.S. Patent application Ser. No. 09/885,078, entitled "COLLECTION INFORMATION MANAGER," filed Jun. 21, 2001, which is incorporated herein by reference in its entirety.

FIELD OF THE INVENTION

This invention relates to automated software systems for processing collections of computer files in arbitrary ways, thereby improving the productivity of software developers, web media developers, and other humans and computer systems that work with collections of computer files.

BACKGROUND OF THE INVENTION

The general problem addressed by this invention is the low productivity of human knowledge workers who use labor-intensive manual processes to work with collections of computer files. One promising solution strategy for this software productivity problem is to build automated systems to replace manual human effort.

Unfortunately, replacing arbitrary manual processes performed on arbitrary computer files with automated systems is a difficult thing to do. Many challenging subproblems must be solved before competent automated systems can be constructed. As a consequence, the general software productivity problem has not been solved yet, despite large industry investments of time and money over several decades.

The present invention provides one piece of the overall functionality required to implement automated systems for processing collections of computer files. In particular, the current invention has a practical application in the technological arts because it provides both humans and software programs with useful information about the contents of collections that require processing.

Problems to be Solved

The Collection Content Classification Problem is one important problem to solve to enable the construction of automated collection processing systems. It is the problem of how to determine collection content members, content types, content processing actions, and content processing interdependencies. Solving the Collection Content Classification problem is important because a solution would enable application programs to process collections of computer files in more powerful, more automated ways than were previously possible.

Some interesting aspects of the general Collection Content Classification problem are these: arbitrary collection types may be involved, containing arbitrary internal structures and numbers of internal products, and arbitrary product types. Arbitrary numbers of files and file types may be involved, requiring arbitrary content processing actions, platform dependent processing actions, and various administrative preferences for all of the above. The general Collection Classification Problem is not a simple problem.

The Collection Multiple Product Problem is another important problem. It is the problem of how to represent multiple collection output products within one collection. This problem is important because it is both intuitive and practical to create several output products from one set of related collection content files. Without a solution to the multiple product problem, a separate collection instance would be required for each desired product, thereby increasing software complexity and maintenance costs.

Some interesting aspects of the multiple product problem are these: an arbitrary number of collection products may be involved, each product may have an arbitrary product type and product content, and an arbitrary set of required product-level, platform-dependent processing actions.

The Collection Content Membership Problem is another important problem. It is the problem of how to dynamically determine what directories and files are part of a collection. This problem is important because manually enumerating collection content files is a tedious, error prone, and non-scalable method.

Some interesting aspects of the Collection Content Membership problem are these: collection content files can belong to separate products on different platforms, content files can be shared among multiple products and platforms, content files can be ignored for particular products and platforms, and content files can be stored outside the host collection subtree for various products and platforms.

The Collection Special Fileset Problem is another important problem. It is the problem of how to identify special content files and then process them in special ways. For example, the normal way to compile Fortran source code files is with code optimization enabled, but some Fortran source files are so big that they cannot be optimized. Therefore a mechanism is needed to process a few large Fortran files out of many in a special way, with code optimization turned off. Without a solution to the Collection Special Fileset problem, automated collection processing systems cannot process special content file cases. This is a significant limitation in real-world industrial software environments, which invariably have special processing situations.

Some interesting aspects of the Collection Special Fileset problem are these: many special files may be involved, although typically only a few files out of many are involved, multiple sets of special files may be involved, and special processes for the special files may range from simple to complex, or similar to very different from the norm.

The Collection Content Type Assignment problem is another important problem. It is the problem of how to dynamically determine a content type for each collection content file. A solution to this problem is important because content types are the primary means for determining automated processing actions for processing content files. Without a proper content type assignment, automated systems cannot easily make decisions on how to process content files.

Some interesting aspects of the Collection Content Type Assignment problem are these: large numbers of content files may be involved, arbitrary user-defined content types must be supported, type assignment methods must not fail on missing filename suffixes, and type assignment mechanisms must use internal parseable type-marker strings when necessary.

The Collection Action Assignment problem is another important problem. This is the problem of how to associate collection content files with appropriate automated file processing actions.

Some interesting aspects of the Collection Action Assignment problem are these: arbitrary processing actions for files, filesets, and products must be supported, processing actions must be chosen in accordance with collection, product, and content types, and processing actions must be sharable, customizable, extensible, and fully user-definable.

The Collection Content Dependency problem is another important problem. This is the problem of how to determine processing dependencies for collection content members. This problem is important because collection content files must be processed in accordance with interdependencies among content files in order to produce valid collection product results.

Some interesting aspects of the Collection Content Dependency problem are these: dependencies exist among files, such as source files depending on include files, dependencies exist among products, such as program products depending on the existence of library products for linking purposes, and dependencies must sometimes be calculated for unknown languages, so an extensible mechanism for dependency calculation is required.

General Shortcomings of the Prior Art

A professional prior art search for the present invention was performed, but produced no meaningful, relevant works of prior art. Therefore the following discussion is general in nature, and highlights the significant conceptual differences between file-oriented mechanisms in the prior art and the novel collection-oriented mechanisms represented by the present invention.

Prior art approaches lack support for collections. This is the largest limitation of all because it prevents the use of high-level collection abstractions that can significantly improve productivity.

Prior art approaches lack collection content listing means to dynamically determine collection content members of each collection product, thereby requiring the use of manually constructed content lists, and increasing software maintenance costs.

Prior art approaches lack collection content typing means to dynamically determine data types for collection content members, thereby preventing flexible, scalable, and automated processing of content according to data type.

Prior art approaches lack extensible collection content dependency means to dynamically determine processing dependencies for collection content members, thereby preventing the easy extension of automated dependency calculations to new programming languages.

Prior art approaches lack product build order means for dynamically determining relative product build order of multiple products within a single collection, thereby preventing the proper construction of multiple collection products.

As can be seen from the above description, prior art mechanisms in general have several important disadvantages. Notably, general prior art mechanisms do not support collections, symbolic content types, or action assignment based on content types. These are the most important limitations of all.

In contrast, the present collection command applicator invention has none of these limitations, as the following disclosure will show.

Specific Shortcomings in Prior Art

Several examples of prior art approaches that classify sets of related computer files are discussed below. The examples fall into two main categories: makefile generator programs and integrated development environment (IDE) programs. Both types of programs classify a list of source files so that the files can be processed efficiently in an automated manner.

Prior Art Makefile Generators

Makefile generator programs generate makefiles for humans who are building software programs. Typically, makefiles contain computer instructions for compiling source code files and linking compiled object files to produce executable files or libraries of object files. In addition, programmers typically include a variety of other useful command sequences in makefiles to increase productivity.

Examples of popular freeware makefile generators include automake, imake, and mkmf (make makefile). Although each program is useful, each program has several important classification shortcomings.

Automake has no dynamic content discovery mechanism; instead it requires programmers to manually list all files that require processing. Neither does it have a mechanism for sharing classification information, so multiple automake files cannot easily share user-provided information. Finally, it uses an input file that must be manually constructed, and so its classification operations are not fully automated.

Imake has no dynamic content discovery mechanism; instead it requires programmers to manually list all files that require processing. It also uses an input file that must be manually constructed, so its classification operations are not fully automated.

Mkmf does have a dynamic content discovery mechanism that dynamically includes all source files in the current directory in the output makefile. However, only the current directory is used to find source files; no other directories are supported. Significantly, all source files in the directory are included, whether they should be included or not. This forces programmers to unnaturally restrict the directory contents to only those file that should be discovered by mkmf. Finally, all files are used to build one product only; files cannot be grouped into multiple products.

Thus these makefile generators, which are characteristic of the prior art, have significant content classification limitations.

Prior Art IDEs

Integrated development environments integrate many software development tools such as editors, compilers, linkers, debuggers, and online documentation into one application program environment. Many IDE programs contain an internal makefile generator to generate makefiles to control the software build process.

However, integrated development environments do not typically have dynamic content discovery mechanisms. Instead, programmers are required to manually identify interesting files for inclusion in the IDE project file. Therefore IDE classification operations are not fully automated. In addition, IDE programs do not typically provide user-customizable means for assigning particular data types to whole projects, or to files within those projects. Thus IDE programs lack user-definable and sharable classification type definition information.

As can be seen from the above descriptions, prior art approaches have several important disadvantages. In contrast, the present collection content classifier invention has none of these limitations, as the following disclosure will show.

SUMMARY OF THE INVENTION

A Collection Content Classifier dynamically discovers and then classifies collection content members, thereby helping application programs to understand and process collections in fully automated ways.

In operation, a collection content classifier constructs the following information for a collection to be processed: a set of collection products, a proper product build ordering for the collection products, a list of content members for each product, a data type for each content member, a symbolic processing action for each content member, and a list of processing dependencies for each content member. Once constructed, classifier information is organized into data structures and made available to calling programs for subsequent use in processing collections.

Collection content classifiers provide extensive collection content information to software programs, thereby enabling software programs to more easily process large numbers of collections in fully automated, scalable ways that were not previously possible.

OBJECTS AND ADVANTAGES

The present collection content classifier invention solves the general prior art limitations described previously. Specifically, the present invention supports collections, dynamically determines collection content, assigns content data types, assigns symbolic content processing actions, and determines content processing dependency relationships.

The main object of collection content classifier systems is to extensively describe collection contents to application programs that process collections. Importantly, collection content descriptions are calculated in a dynamic manner, thereby promoting the construction of automated collection processing systems. Fully automated collection processing systems can significantly improve human productivity by processing collections of computer files in ways that were not possible before.

Another object is to dynamically determine collection content members, thereby reducing software maintenance costs by avoiding the use of manually constructed lists of content members for collection products.

Another object is to dynamically determine and assign collection content data types, thereby reducing software maintenance costs by avoiding the use of manually constructed lists of data types for content members.

Another object is to dynamically determine processing dependency relationships for collection content members, thereby reducing software maintenance costs by avoiding the use of manually constructed dependency lists.

Another object is to dynamically classify the content of mobile collections, thereby allowing multiple receiving sites to classify collection content using local site administrative and classification preferences.

A final object is to provide a generalized, scalable, and automated collection classifier means, thereby enabling the construction of generalized, scalable, automated collection processing systems.

As can be seen from the objects above, collection content classifiers provide extensive collection content information to application programs that process collections.

Classifiers thus improve human productivity by enabling application programs to classify and process collections in scalable, automated ways that were not previously possible.

Further advantages of the present Collection Content Classifier invention will become apparent from the drawings and disclosure below.

BRIEF DESCRIPTION OF DRAWINGS

FIG. 1 shows a sample prior art filesystem folder in a typical personal computer filesystem.

FIG. 2 shows how a portion of the prior art folder in FIG. 1 has been converted into a collection 100 by the addition of a collection specifier file 102 named "cspec" FIG. 2 Line 5.

FIG. 3 shows an example physical representation of a collection specifier 102, implemented as a simple text file such as would be used on a typical personal computer filesystem.

FIG. 8 shows an example software collection datastructure that relates collection specifier and collection content information for a single collection instance.

FIG. 9 shows an example collection type definition datastructure, such as might be used by software programs that process collections.

FIG. 10 shows a more detailed example of the kinds of information found in collection type definitions.

FIG. 14 shows a simplified algorithm for a Collection Content Classifier Manager Means 130.

FIG. 15 shows a simplified "coll-class-content" data structure produced by a Collection Content Classifier Manager Means 130.

FIG. 16 shows a four-level type definition hierarchy for storing collection type definition information.

FIG. 18 shows a simplified algorithm for a Get Collection Membership Information Manager module 140.

FIG. 19 shows a simplified "prod-class-content" data structure produced by a Get Collection Membership Information Manager module 140.

FIG. 20 shows a simplified "content-class-entry" data structure produced by a Get Collection Membership Information Manager module 140.

FIG. 21 shows an example collection type index table and collection type definition file.

FIG. 22 shows an example product type index table and product type definition file corresponding to the "cf-coll-program" collection type of FIG. 21.

FIG. 23 shows an example source directory list definition file corresponding to the "cf-program" product type of FIG. 22.

FIG. 24 shows an example library directory list definition file corresponding to the "cf-program" product type of FIG. 22.

FIG. 25 shows an example collection tree structure with nested source directories and library directories.

FIG. 26 shows lists of selected content members for the collection of FIG. 25, organized by computing platform.

FIG. 27 shows a collection specifier containing special product directives for an external source directory and source file.

FIG. 28 shows a simplified architecture for an Assign Collection Content Types Manager module 150.

FIG. 29 shows a simplified algorithm for an Assign Collection Content Types Manager module 150.

FIG. 30 shows an example file identification table for identifying content types of information stored within collection source files.

FIG. 31 shows a collection specifier containing an example fileset specification.

FIG. 32 shows a simplified architecture for an Assign Collection Actions Manager module 160.

FIG. 33 shows a simplified algorithm for an Assign Collection Actions Manager module 160.

FIG. 34 shows an example content type index table and content type definition file corresponding to the "cf-coll-program" product type of FIG. 22.

FIG. 35 shows an example action type index table and action type definition file corresponding to the "content-c" content type of FIG. 34.

FIG. 36 shows a simplified architecture for a Calculate Collection Content Dependencies Manager module 170.

FIG. 37 shows a simplified algorithm for a Calculate Collection Content Dependencies Manager module 170.

FIG. 38 shows an example dependencies output file produced by an External Parser Means module 174.

FIG. 39 shows an example collection tree structure to illustrate a complete classification example.

FIG. 40 shows an example multi-product collection specifier file for the collection of FIG. 39.

FIG. 41 shows part 1 of an example classification output for the collection of FIG. 39.

FIG. 42 shows part 2 of an example classification output for the collection of FIG. 39.

LIST OF DRAWING REFERENCE NUMBERS

Figure 4:
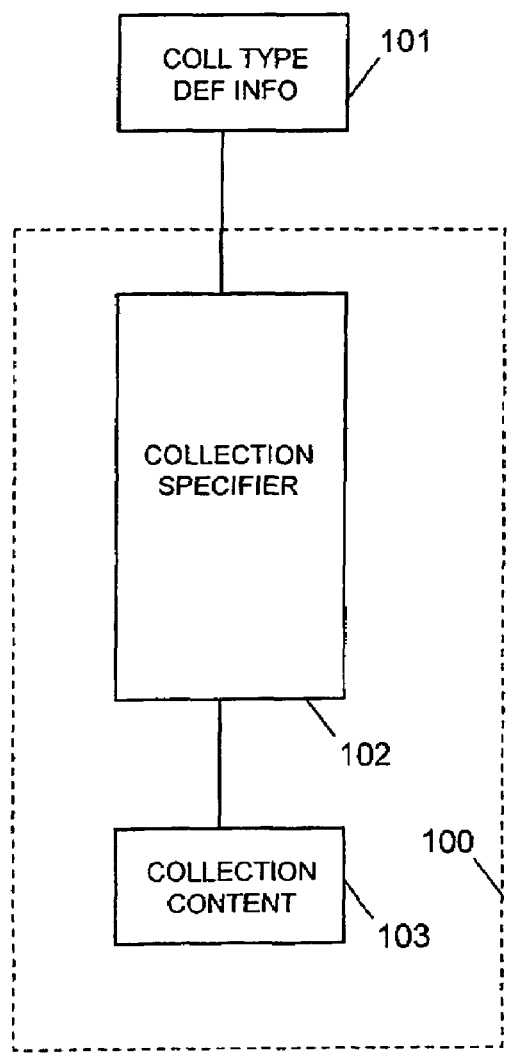
FIG. 4 shows four major information groupings for collections, including collection type definition 101, collection specifier 102, collection content 103, and collection 100.

100 A collection formed from a prior art folder
101 Collection type definition information
102 Collection specifier information
103 Collection content information
104 Per-collection collection processing information
105 Per-collection collection type indicator
106 Per-collection content link specifiers
107 Collection information means
110 Application program means
111 Collection information manager means
112 Collection type definition API means
113 Collection specifier API means
114 Collection content API means
115 Collection type definition server means
116 Collection specifier server means
117 Collection content server means
120 Application Program
121 Get Runtime Information module
122 Collection content classifier means
123 Application collection processing manager module
125 Collection information data source
130 Collection content classifier manager means
131 Get classifier runtime information
132 Output content classification information
140 Get collection membership information manager
141 Get collection information
142 Get collection product directory type definitions
143 Get collection type definition information
144 Get product type definition information
145 Get source directory definition information
146 Get product content list
147 Get platform source directory lists
148 Search source directories
150 Assign collection content types manager
151 Get file identification definition information
152 Identify collection content types
153 Record special fileset types module
160 Assign collection actions manager
161 Get content type definition information
162 Get action type name information
163 Identify all action matches
164 Record all action matches
170 Calculate collection content dependencies manager
171 Get content parser name
172 Parse content for dependencies
173 Internal parser means
174 External parser means
175 Record dependency information

DETAILED DESCRIPTION

Overview of Collections

This section introduces collections and some related terminology.

Collections are sets of computer files that can be manipulated as a set, rather than as individual files. Collection information is comprised of three major parts: (1) a collection specifier that contains information about a collection instance, (2) a collection type definition that contains information about how to process all collections of a particular type, and (3) optional collection content in the form of arbitrary computer files that belong to a collection.

Collection specifiers contain information about a collection instance. For example, collection specifiers may define such things as the collection type, a text summary description of the collection, collection content members, derivable output products, collection processing information such as process parallelism limits, special collection processing steps, and program option overrides for programs that manipulate collections.

Collection specifiers are typically implemented as simple key-value pairs in text files or database tables. Collection type definitions are user-defined sets of attributes that can be shared among multiple collections. In practice, collection specifiers contain collection type indicators that reference detailed collection type definitions that are externally stored and shared among all collections of a particular type. Collection type definitions typically define such things as collection types, product types, file types, action types, administrative policy preferences, and other information that is useful to application programs for understanding and processing collections.

Collection content is the set of all files and directories that are members of the collection. By convention, all files and directories recursively located within an identified set of subtrees are usually considered to be collection members. In addition, collection specifiers can contain collection content directives that add further files to the collection membership. Collection content is also called collection membership.

Collection is a term that refers to the union of a collection specifier and a set of collection content.

Collection information is a term that refers to the union of collection specifier information, collection type definition information, and collection content information.

Collection membership information describes collection content.

Collection information managers are software modules that obtain and organize collection information from collection information stores into information-rich collection data structures that are used by application programs.

Collection Physical Representations—Main Embodiment

FIGS. 1-3 show the physical form of a simple collection, as would be seen on a personal computer filesystem.

FIG. 1 shows an example prior art filesystem folder from a typical personal computer filesystem. The files and directories shown in this drawing do not implement a collection 100, because no collection specifier 102, FIG. 2 Line 5 exists to associate a collection type definition FIG. 4 101 with collection content information FIG. 4 103.

FIG. 2 shows the prior art folder of FIG. 1, but with a portion of the folder converted into a collection 100 by the addition of a collection specifier file FIG. 2 Line 5 named "cspec". In this example, the collection contents FIG. 4 103 of collection 100 are defined by two implicit policies of a preferred implementation.

First is a policy to specify that the root directory of a collection is a directory that contains a collection specifier file. In this example, the root directory of a collection 100 is a directory named "c-myhomepage" FIG. 2 Line 4, which in turn contains a collection specifier file 102 named "cspec" FIG. 2 Line 5.

Second is a policy to specify that all files and directories in and below the root directory of a collection are part of the collection content. Therefore directory "s" FIG. 2 Line 6, file "homepage.html" FIG. 2 Line 7, and file "myphotojpg" FIG. 2 Line 8 are part of collection content FIG. 4 103 for said collection 100.

FIG. 3 shows an example physical representation of a collection specifier file 102, FIG. 2 Line 5, such as would be used on a typical personal computer filesystem.

Collection Information Types

Figure 5:
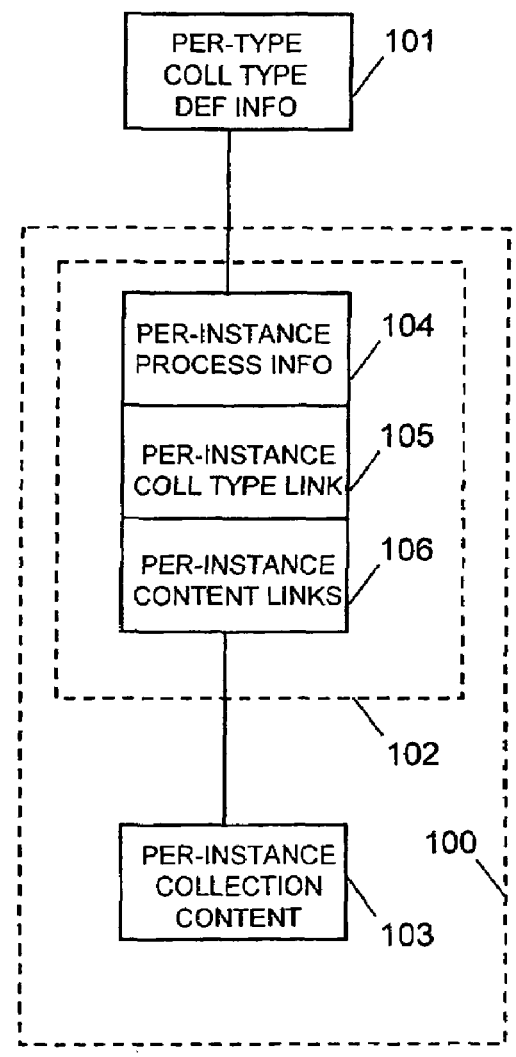
FIG. 5 shows a more detailed view of the information groupings in FIG. 4, illustrating several particular kinds of per-collection-instance and per-collection-type information.

FIGS. 4-5 show three kinds of information that comprise collection information.

FIG. 4 shows a high-level logical structure of three types of information that comprise collection information: collection processing information 101, collection specifier information 102, and collection content information 103. A logical collection 100 is comprised of a collection specifier 102 and collection content 103 together. This diagram best illustrates the logical collection information relationships that exist within a preferred filesystem implementation of collections.

FIG. 5 shows a more detailed logical structure of the same three types of information shown in FIG. 4. Collection type definition information FIG. 4 101 has been labeled as per-type information in FIG. 5 103 because there is only one instance of collection type information 101 per collection type. Collection content information FIG. 4 103 has been labeled as per-instance information in FIG. 5 103 because there is only one instance of collection content information per collection instance. Collection specifier information 102 has been partitioned into collection instance processing information 104, collection-type link information 105, and collection content link information 106. FIG. 5 is intended to show several important types of information 104-106 that are contained within collection specifiers 102.

Figure 6:
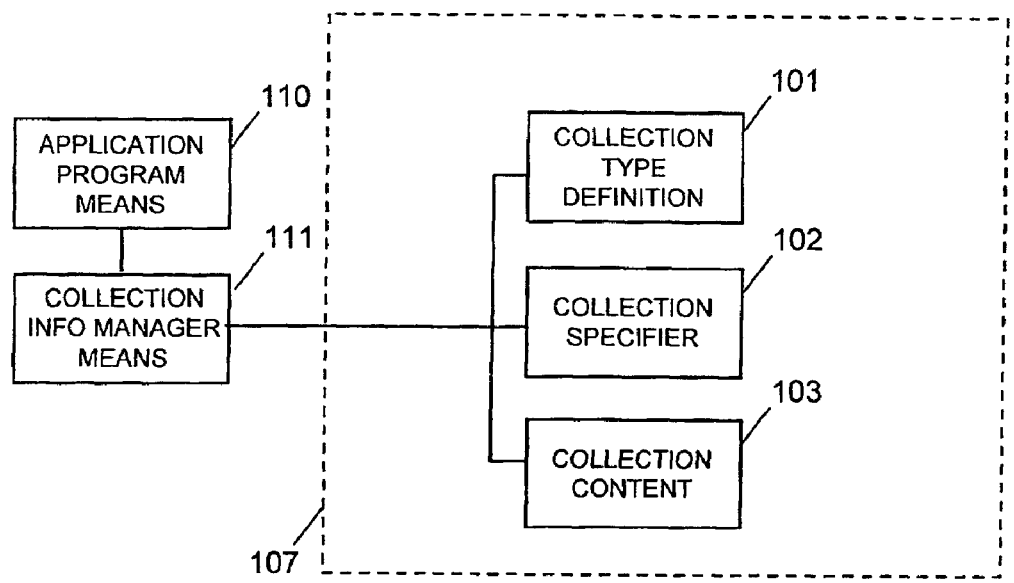
FIG. 6 shows a logical diagram of how a Collection Information Manager Means 111 would act as an interface between an application program means 110 and a collection information means 107, including collection information sources 101-103.

Suppose that an application program means FIG. 6 110 knows (a) how to obtain collection processing information 101, (b) how to obtain collection content information 103, and (c) how to relate the two with per-collection-instance information 102. It follows that application program means FIG. 6 110 would have sufficient knowledge to use collection processing information 101 to process said collection content 103 in useful ways.

Collection specifiers 102 are useful because they enable all per-instance, non-collection-content information to be stored in one physical location. Collection content 103 is not included in collection specifiers because collection content 103 is often large and dispersed among many files.

All per-collection-instance information, including both collection specifier 102 and collection content 103, can be grouped into a single logical collection 100 for illustrative purposes.

Collection Application Architectures

Figure 7:
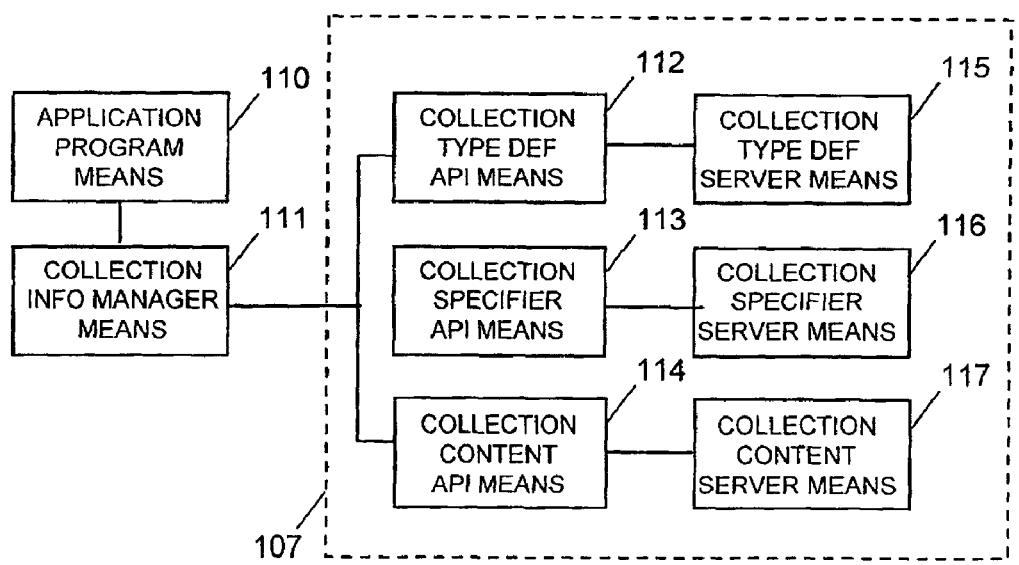
FIG. 7 shows a physical software embodiment of how an Application Program Means 110 would use a Collection Information Manager Means 111 to obtain collection information from various collection information API means 112-114 connected to various collection information server means 115-117.

FIGS. 6-7 show example collection-enabled application program architectures.

FIG. 6 shows how a collection information manager means 111 acts as an interface between an application program means 110 and collection information means 107 that includes collection information sources 101-103. Collectively, collection information sources 101-103 are called a collection information means 107. A collection information manager means 111 represents the union of all communication mechanisms used directly or indirectly by an application program means 110 to interact with collection information sources 101-103.

FIG. 7 shows a physical software embodiment of how an application program means 110 could use a collection information manager means 111 to obtain collection information from various collection information API (Application Programming Interface) means 112-114 connected to various collection information server means 115-117.

Collection type definition API means 112 provides access to collection type information available from collection type definition server means 115. Collection specifier API means 113 provides access to collection specifier information available from collection specifier server means 116. Collection content API means 114 provides access to collection content available from collection content server means 117.

API means 112-114, although shown here as separate software components for conceptual clarity, may optionally be implemented wholly or in part within a collection information manager means 111, or within said server means 115-117, without loss of functionality.

API means 112-114 may be implemented by any functional communication mechanism known to the art, including but not limited to command line program invocations, subroutine calls, interrupts, network protocols, or file passing techniques.

Server means 115-117 may be implemented by any functional server mechanism known to the art, including but not limited to database servers, local or network file servers, HTTP web servers, FTP servers, NFS servers, or servers that use other communication protocols such as TCP/IP, etc.

Server means 115-117 may use data storage means that may be implemented by any functional storage mechanism known to the art, including but not limited to magnetic or optical disk storage, digital memory such as RAM or flash memory, network storage devices, or other computer memory devices.

Collection information manager means 111, API means 112-114, and server means 115 117 may each or all optionally reside on a separate computer to form a distributed implementation. Alternatively, if a distributed implementation is not desired, all components may be implemented on the same computer.

Collection Data Structures

FIGS. 8-10 show several major collection data structures.

FIG. 8 shows an example collection datastructure that contains collection specifier and collection content information for a collection instance. Application programs could use such a datastructure to manage collection information for a collection that is being processed.

In particular, preferred implementations would use collection datastructures to manage collection information for collections being processed. The specific information content of a collection datastructure is determined by implementation policy. However, a collection specifier typically contains at least a collection type indicator FIG. 8 Line 4 to link a collection instance to a collection type definition.

FIG. 9 shows an example collection type definition datastructure that could be used by application programs to process collections. Specific information content of a collection type definition datastructure is determined by implementation policy. However, collection type definitions typically contain information such as shown in FIGS. 9-10.

FIG. 10 shows example information content for a collection type definition datastructure such as shown in FIG. 9. FIG. 10 shows information concerning internal collection directory structures, collection content location definitions, collection content datatype definitions, collection processing definitions, and collection results processing definitions. The specific information content of a collection type definition is determined by implementation policy. If desired, more complex definitions and more complex type definition information structures can be used to represent more complex collection structures, collection contents, or collection processing requirements.

Collection Content Classifier Means

Figures 11, 12:
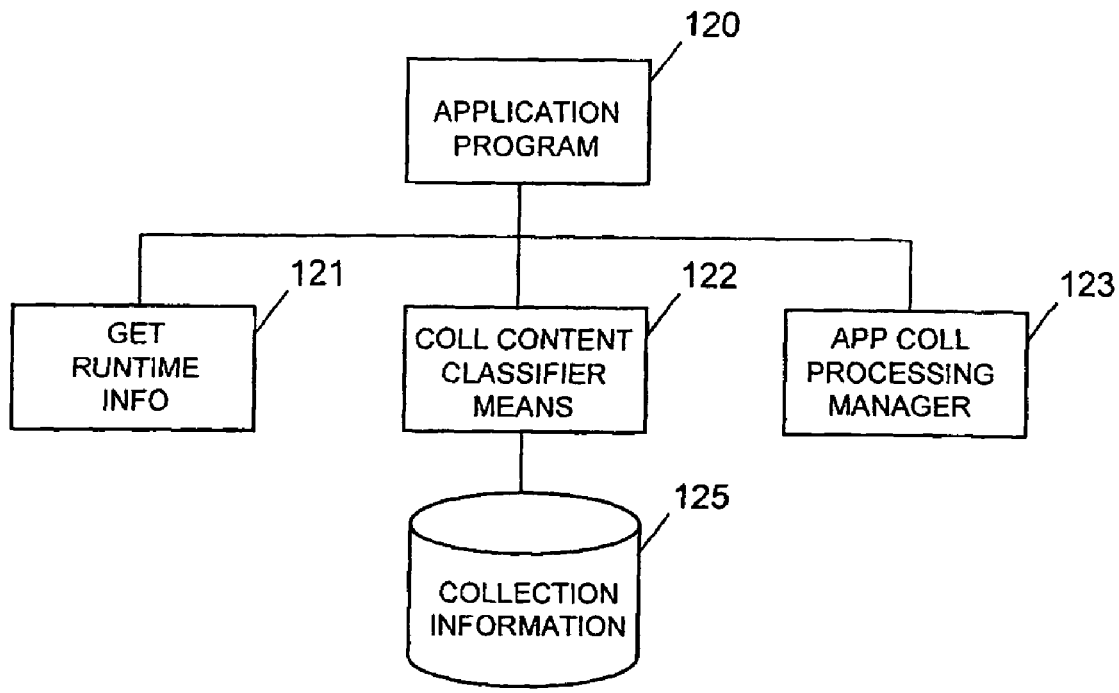
FIG. 11 shows a simplified architecture for a classifier-enabled application program.
FIG. 12 shows a simplified algorithm for a classifier-enabled application program.

FIG. 11 shows a simplified architecture for a classifier-enabled Application Program 120. Classifier-enabled application programs use collection classifiers to obtain useful information about collections and their contents, then subsequently use the obtained information to process collections in useful ways.

Get Runtime Information 121 obtains initial configuration information, command line arguments, and environment variable information, and then makes the obtained information available to the application invocation.

Collection Content Classifier Means 122 provides a list of organized collection content information to the invocation, including lists of collection content members, content types, associated processing actions that should be applied to the content members, and processing dependencies among the content members.

Collection Information 125 stores collection information for use by application programs that process collections.

Application Collection Processing Manager 123 is a software module that process collections in useful ways, using content classification information produced by a Collection Content Classifier Means 122.

Operation

In operation, Application Program 120 proceeds according to the simplified algorithm shown in FIG. 12.

First, Application Program 120 calls Get Runtime Information 121 to obtain useful invocation runtime information, including configuration settings, command line arguments, and environment variable settings. In particular, the collection to be classified and processed is usually obtained and provided as part of the invocation runtime information.

Next, Collection Content Classifier Means 122 is called to obtain classification information for the current collection being processed. In general, the output classification information answers the following four questions about a collection: (1) What content does the collection contain? (2) What are the content types of each content file? (3) What processing actions should be carried out on each content file? (4) What processing dependencies exist among content files?

Finally, Application Collection Processing Manager 123 is used to process the current collection in useful ways, in accordance with the previously obtained classification information, thereby fulfilling the overall function of Application Program 120.

Now that the overall program architecture has been introduced, more detailed explanations can be provided below.

Collection Classifier Manager Means

Figure 13:
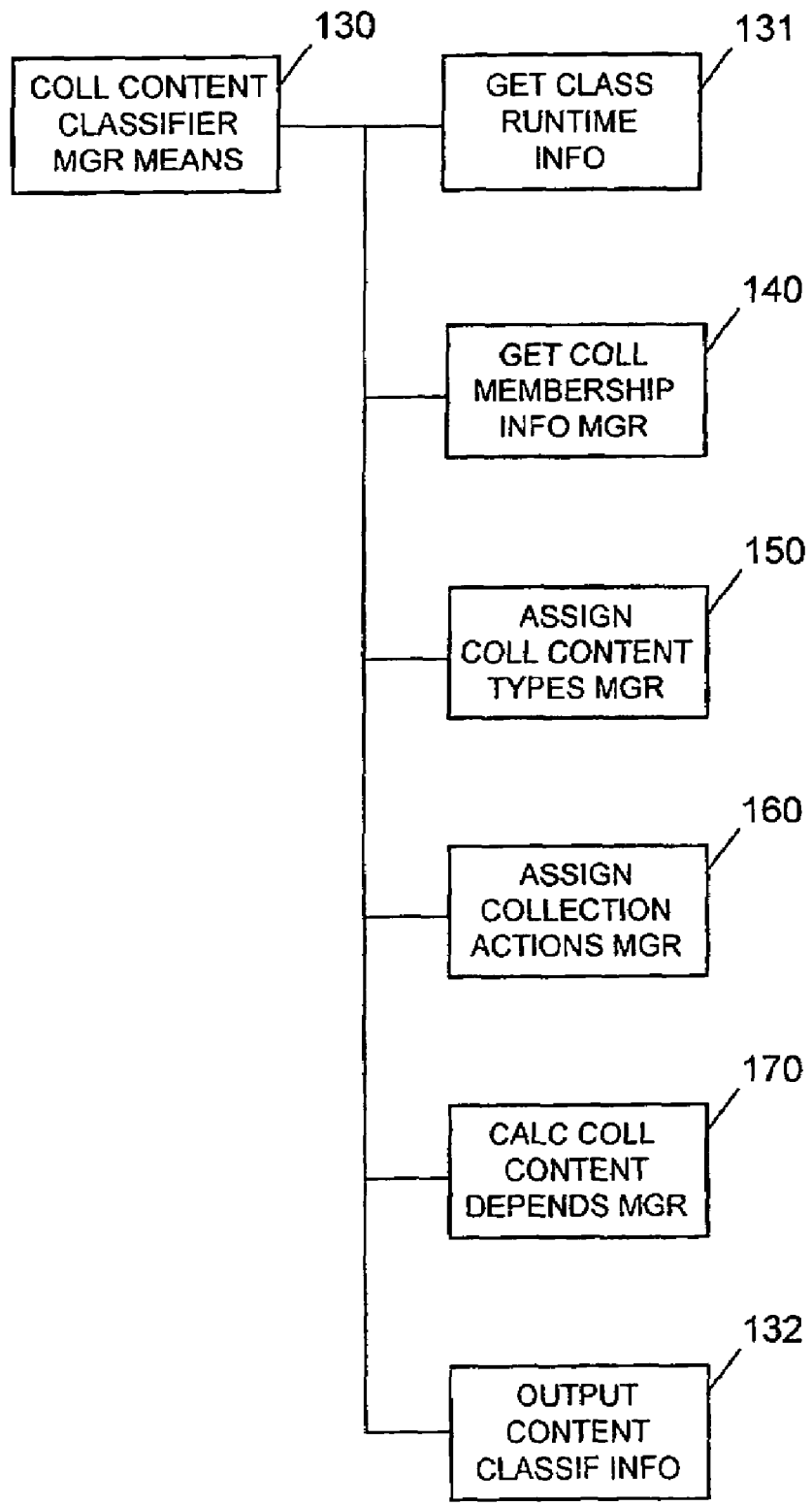
FIG. 13 shows a simplified architecture for a Collection Content Classifier Manager Means 130.

FIG. 13 shows a simplified architecture for a Collection Content Classifier Means 130. The main function of this module is to obtain and organize lists of collection content, content types, processing actions, and content interdependencies, for use by application programs. A Collection Classifier Means 130 is not responsible for executing processing actions on collections; instead, classifiers are limited to performing an information gathering role.

Get Classification Runtime Information 131 is responsible for obtaining runtime information for classification operations. If Classifier Manager Means 130 is implemented as a standalone program, then Get Classification Runtime Information 131 is responsible for obtaining all runtime information for the program. However, if Classifier Manager Means 130 is implemented as a functional subroutine service or library to a calling program such as shown in FIG. 11, then much of work done by Get Classification Runtime Information 131 would naturally be provided by Get Runtime Information 121. The specific division of work between the two runtime modules is determined by implementation policy.

Get Collection Membership Information Manager 140 is responsible for producing an organized list of content members for the collection, as specified by a collection specifier. Not all computer files within a collection filesystem subtree need to appear on the final content list; files can be ignored if they match "ignore" policies set in the collection type definition for the collection being classified.

Assign Collection Content Types Manager 150 is responsible for determining and assigning a valid content type to each computer file appearing on the content list provided by Get Collection Membership Information Manager 140. Content types are important because they associate content member instances with predetermined type definition information that can be used to process content members in ways appropriate for their internal content.

Assign Collection Content Actions Manager 160 is responsible for using assigned content types to determine corresponding symbolic processing actions for each content member. A Collection Content Classifier Means 122 does not directly execute symbolic processing actions. Instead, classifiers classify, and other software modules translate assigned symbolic actions into executable processing instructions.

Calculate Collection Content Dependencies Manager 170 is responsible for determining processing dependencies among content members. Processing dependencies are important because they must be followed in order to ensure successful collection processing results. For example, a software build operation applied to a collection containing both a program and a library will fail if the library is not built before it is linked to the program module.

Finally, Output Content Classification Information 132 is responsible for organizing and presenting classification information to consumers of the information. For example, classification information could be passed to a calling program, be written to a display screen, be written to a computer file, or be sent over a network connection.

Operation

In operation, Collection Content Classifier Manager Means 130 proceeds according to the simplified algorithm shown in FIG. 14. Generally speaking, Collection Content Classifier Manager Means 130 calls modules 140-170 in numeric order to perform a classification operation.

First, the algorithm builds data structures to support the classification computation. For example, the algorithm might build data structures shown in FIGS. 15, 19, and 20. Specific data structure building behaviors are determined by implementation policy.

FIG. 15 shows a simplified top-level data structure "coll-class-content" for holding classification information. The first section Lines 3-5 contains information relating to the particular collection instance being classified. For example, this section might contain a collection data structure such as shown in FIG. 8. The second section Lines 6-8 contains classification information describing content members of the collection. The third section Lines 9-14 contains type definition information used to classify the collection.

Next, the algorithm calls Get Classification Runtime Information 131 to obtain and make runtime information available to the invocation.

Next, the algorithm calls Get Collection Membership Information Manager 140 to obtain a list of interesting content files within the collection. The list of content files is stored within data structures FIGS. 15, 19, and 20, and is returned to Collection Content Classifier Manager Means 130 for further processing. Details of constructing collection content lists are provided in a later section of this document. Membership information may be usefully returned to the calling program at this point if content type assignment is not required.

Having obtained a list of content members, Collection Content Classifier Manager Means 130 calls Assign Collection Content Types Manager 150 to determine a content type for each content member in the content list. Content types are generally determined by examining file names and file contents.

Assigned content types are written into "content-class-entry" data structures FIG. 20, and returned to the calling module Collection Content Classifier Manager Means 130 for further processing. Details of content type classification are provided in a later section of this document. Content type information may be usefully returned to the calling program at this point if action assignment is not required.

Once content types have been assigned, Collection Content Classifier Manager Means 130 calls Assign Collection Content Actions Manager 150, which uses the assigned content types to further assign symbolic processing actions to content members. Processing actions are normally determined by performing a simple type-action table lookup, using the assigned content type as a key into a table of actions.

Resulting action values are written into "content-class-entry" data structures FIG. 20, and returned to the calling module Collection Content Classifier Manager Means 130 for further processing. Details of action assignment classification are provided in a later section of this document. Action values may be usefully returned to the calling program at this point if dependency calculations are not required.

Having obtained content type and action values, Collection Content Classifier Manager Means 130 calls Calculate Collection Content Dependencies Manager 170 to determine processing dependencies among content members. Dependency determination normally requires parsing of the internal content of each content member within a collection product. Parsing can be performed by either internal or external dependency parsers. Providing for external parsers is important because it allows a collection classifier to be easily extended to support new content languages that were not supported when the classifier was first constructed.

Dependency information is written into "content-class-entry" data structures FIG. 20, and returned to the calling module Collection Content Classifier Manager Means 130 for further processing. Details of dependency parsing and calculation are provided in a later section of this document.

Having thus obtained a list of collection content members and their corresponding content types, action values, and processing interdependencies, Collection Content Classifier Manager Means 130 has completed its main function of classifying a collection.

Finally, Collection Content Classifier Manager Means 130 calls Output Content Classification Information 132 to perform final organizing and distribution of classification results. For example, results could be displayed on a computer screen, written to a computer file, or be sent over a network connection.

Importantly, classification results are normally returned to the calling module Collection Content Classifier Manager Means 130, which in turn would make them available to Application Program 120 and Application Collection Processing Manager 123 for subsequent use in processing the current collection.

A "coll-class-content" data structure FIG. 15, when fully populated, contains essentially all classification information that there is to know about a collection. Although FIG. 15 shows the "coll-class-content" data structure as a single data structure for presentation clarity, a plurality of smaller data structures could be also used to carry equivalent information. The specific size, content, and nature of particular data structures are determined by implementation policy.

It should be noted that Collection Content Classifier Manager Means 130 is not required to execute all steps 5-7 of algorithm FIG. 14. Instead, the algorithm could usefully return partial constructed membership information to the calling software after step 4, 5, or 6 if the information produced by the following steps 5, 6, or 7 was not required. This is because partial classification information is useful on its own. For example, membership information (step 4) is still useful without type, action, and dependency information. Typed membership information (steps 4-5) is still useful without action and dependency information. And membership, type, and action information (steps 4-6) is still useful without dependency information.

Collection Type Information

Classifying collection content is essentially a matching process between collection instance values and predetermined classification criteria. For instance, collection content membership is determined by matching file names against membership definition criteria. Collection content types are determined by matching content member file names or internal file contents against content type definition criteria. Content actions are determined by matching content types against predetermined type-action pairs, and so on.

This section describes a preferred implementation for managing predetermined collection type definition information that can be used in collection classification processes.

FIG. 16 shows a four-level type definition hierarchy for collection classification information that is used by a Collection Content Classifier Means 130.

Lines 1-4 show four major levels in the type definition tree. The first level Line 1 models whole collection types. The second level Line 2 models product types within collection types. The third level Line 3 models content types within product types. The fourth level Line 4 models action types within content types.

Importantly, each level provides human users an opportunity to customize subsequent type definition information lower in the tree. For example, two different collection types FIG. 16 Lines 8-9 could have two completely different product type definitions for the same product name. Similarly, two different product types within the same collection type could specify lists of completely different content types, or different content definitions for the same content type name. Two different content types within the same product type could specify completely different action types, and so on. This type hierarchy provides valuable flexibility to human users that must define collection type information for various computational situations.

In practice, closely related types frequently share type definition information because sharing reduces type information maintenance costs. Typically, environments that use closely related collection types will share more information than environments that use unrelated collection types. Particular amounts of information sharing and overlap are determined by implementation policy.

FIG. 16 Lines 5-24 show several related excerpts from example type definition files.

In what follows, excerpts will be used to show how type definitions are chained together to form a type definition hierarchy for a typical collection. The example collection contains two products, a program and library written in the "C" programming language.

FIG. 16 Line 5 shows the name of an example collection specifier file such as shown in FIG. 2 Line 5 and FIG. 3. Only one interesting line from the example collection specifier file is shown on Line 6, to save presentation space. Line 6 provides a collection type indicator "ct-program" that specifies the collection type of the collection. The collection type "ct-program" indicates that the host collection contains source code files for an executable "C" program.

Lines 7-9 represent an index file of collection types known to the implementation. Using the collection type "ct-program" Line 6 as a key into the index table, Line 8 Column 2 provides the name of a corresponding collection type definition file "ct-program.def".

Lines 10-11 represent an excerpt of a collection type definition file for the "ct-program" collection type. Each collection type definition file must provide a list of known products for its collection type. Line 11 Column 2 provides the filename of an index file that lists known product types for the "ct-program" collection type.

Lines 12-13 represent an index file of known product types for the "ct-program" collection type. Line 13 contains a product type name "pt-program" that points to a product type definition file "pt-program.def".

Lines 14-15 represent a product type definition file for the "pt-program" product type. Line 15 provides the filename of an index file of known content types for the product type "pt-program".

Lines 16-17 represent an index file of known content types for the "pt-program" product type. Line 16 contains a content type name "content-c" that points to a content type definition file "content-c.def".

Lines 18-19 represent a content type definition file for the "content-c" content type. Line 19 provides the filename of an index file of known action types for the content type "content-c".

Lines 20-21 represent an index file of known action types for the "content-c" content type. Line 21 contains an action type name "action-c" that points to an action type definition file "action-c.def".

Lines 22-24 represent an action type definition file for the "action-c" action type. Lines 23-24 specify that an internal parser named "internal-c" should be used to parse content files for dependencies.

The four levels shown above correspond to natural, practical problem boundaries. First, the collection type level models the types and characteristics of whole collections. Second, since collections may contain multiple products, a product type level is useful to model products. Third, since products are comprised of files containing various types of content, a content type level is useful for modeling those content files. And fourth, since various types of content files require different processing actions, an action type level is useful for modeling the various actions.

Now that an overview of the fundamental four-level type hierarchy has been presented, the discussion will return to describing how a collection classifier uses the type hierarchy to classify collections.

Collection Content Lists

Figure 17:
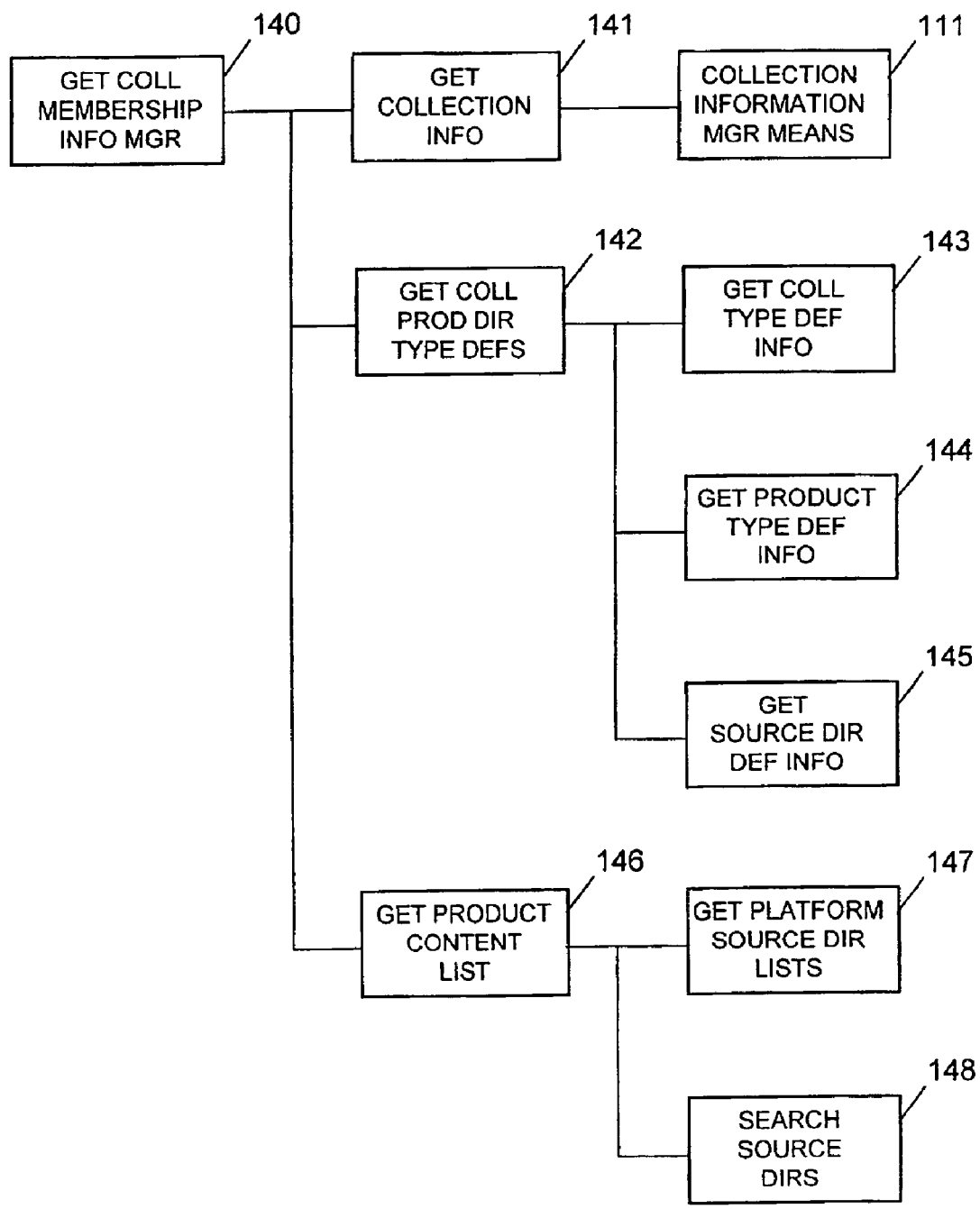
FIG. 17 shows a simplified architecture for a Get Collection Membership Information Manager module 140.

FIG. 17 shows a simplified architecture for a Get Collection Membership Information Manager module 140. The main function of this module is to dynamically generate a list of interesting collection content members for each product contained within the collection.

Get Collection Information 141 obtains collection information from a Collection Information Manager 111 (see "Cross References to Related Patent Applications" at the beginning of this document for more information). Collection Information Manager 111 returns at least collection specifier information 102, which may include lists of multiple products, special filesets, and collection membership information.

Get Collection Product Directory Type Definitions 142 is responsible for obtaining several parts of the four-level type hierarchy for use in constructing a content membership list. Subordinate module Get Collection Type Definition Information 143 obtains and returns collection type definition information, corresponding to the first level of the type hierarchy previously discussed. Subordinate module Get Product Type Definition Information 144 obtains and returns product type definition information, corresponding to the second level of the type hierarchy previously discussed. Subordinate module Get Source Directory Definition Information 145 obtains and returns lists of directories that should be searched for collection content files.

Get Product Content List 146 is responsible for constructing a list of collection contents, organized by collection product. Subordinate module Get Platform Source Directory Lists 147 selects a platform-relevant subset of directories from the list of directories produced by Get Source Directory Definition Information 145 above. Subordinate module Search Source Directories 148 performs a search of relevant directories to obtain and return a list of collection content files.

Operation

In operation, Get Collection Membership Information Manager 140 proceeds according to the simplified algorithm shown in FIG. 18.

First, the algorithm builds implementation data structures to support the construction of a collection content list. In particular, data structures shown in FIGS. 19-20 would be constructed if not already constructed by earlier modules.

Next, the algorithm obtains a list of collection products by calling Get Collection Information 141 and Collection Information Manager 111. In particular, this process step will produce a collection type, a list of collection products, and a list of corresponding product types. It may also produce other collection specifier information, including a list of special filesets.

Next, the algorithm uses the obtained collection type and product types to obtain complete type definition information from the four-level type hierarchy. Get Collection Membership Information Manager 140 calls Get Collection Product Directory Type Definitions 142 and subordinate modules 143-145 to perform the work involved.

Next, Get Collection Type Definition Information 143 is called to obtain collection type definition information by reading collection type index files and definition files such as those shown in FIG. 21, Lines 14 and Lines 5-8 respectively. Collection type information so obtained is stored in data structures FIG. 15 Line 10 for subsequent use.

Next, Get Product Type Definition Information 144 is called to obtain product type definition information by reading product type index files and definition files such as those shown in FIG. 22, Lines 1-5 and Lines 6-12, respectively. Product type information so obtained is stored in data structures FIG. 15 Line 11 for subsequent use.

Next, Get Source Directory Definition Information 145 is called to obtain lists of directories that should be searched for collection content files, as shown by FIG. 22 Lines 8-9 and FIGS. 23-24. Note that multiple per-platform directory sets are contained within the definition files shown in FIGS. 23-24. For example, Lines 2-6 specify directories for the "gnulinux2" platform. Other classifier modules eventually select a particular per-platform directory set for the platform currently being classified.

Next, Get Product Content List 146 is called to produce a content membership list for each product within the host collection. Get Product Content List 146 first calls subordinate module Get Platform Source Directory Lists 147 to obtain and return a set of directories corresponding to the particular computing platform for which the collection is being classified. The use of per-platform content source directories is described at length in the following section.

Finally, Get Product Content List 146 calls Search Source Directories 148 to search the selected source directories to find content files. Found content files are stored in data structures FIG. 19-20 and returned to Get Collection Membership Information Manager 140 for subsequent classification use.

Collection Content Directories

Classification of content with respect to computing platform is important because collections can contain platform-dependent source files. It follows that a collection content classifier must identify only those files corresponding to the current classification platform. Otherwise, an incorrect set of content files will be identified, leading to incorrect collection product results.

The current classification platform is usually a platform subdirectory immediately beneath the root directory of the collection subtree. For example, FIG. 25 shows two platform directories "win98.plt" Line 27 and "gnulinux2.plt" Line 29. Importantly, source directory lists such as those shown in FIGS. 23-24 are usually constructed with relative pathnames based on platform directories. For example, if "win98.plt" FIG. 25 Line 27 is the current classification platform directory, then the source directory relative pathname ". . . /s/win98" FIG. 23 Line 7, points to a source directory "win98.plt" FIG. 25 Line 11, that contains a platform dependent source file "file2-pd.c" on Line 12.

FIG. 26 illustrates how content files from FIG. 25 are selected using source directory lists from FIGS. 23-24. FIG. 25 shows an example collection tree structure with nested source directories and library directories. The example collection in FIG. 25 is more complex than typical collections in order to illustrate the use of per-platform source directories. FIG. 26 shows the content files that would be selected for the "win98" platform and for the "gnulinux2" platform, respectively.

In operation, directories are selected as follows. First, a product type definition file "pt-program.def" FIG. 22 specifies the filenames of source directories for program and library source files, Lines 8 and 9 respectively. FIG. 23 shows example source directory pathname definitions for program source files. FIG. 24 shows example source directory pathname definitions for library source files.

Supposing that the current classification platform is "win98", Get Platform Source Directory Lists 147 would select Lines 7-10 from FIG. 23 for use in identifying program source files for product type "pt-program" as defined in FIG. 22. Similarly, Lines 7-10 from FIG. 24 would be selected for use in identifying library source files for product type "pt-program" as defined in FIG. 22.

Search Source Directories 148 proceeds to find content files by traversing directory lists in order from most platform-specific to least platform-specific. The main idea is to find and use the most platform-specific content files available. This method makes it easy for programmers and collection authors to share files among platforms, and to override shared files with special, more platform-specific files when the need arises. The most-to-least order corresponds to a top-to-bottom order in FIGS. 23-24.

Continuing with the "win98" platform, Search Source Directories 148 would begin with the directory shown on Line 7 of FIG. 23, and would progress toward Line 10. Line 7 names a directory containing files for only the "win98" platform. Line 8 names a directory containing files that could be shared among all "win" platforms. Line 9 names a directory containing platform-independent files. Line 10 also names a directory that contains files shared by all platforms.

In practice, the "s" directory named in Line 10 will not contain content files if a subordinate "pi" directory such as the one named in Lines 9 exists. In such cases, platform-independent files that would normally reside in "s" are moved into subordinate directory "pi" so that all content files will reside at the same level in the source tree.

FIG. 26 shows the result of searching collection tree FIG. 25 using program FIG. 23 and library directory FIG. 24 sets for "win98" and "gnulinux2" platforms respectively. As can be seen from the file pathnames shown in FIG. 26, the most platform-specific version of each available file has been selected.

Having thus obtained a list of content files for each product in the collection, classification continues by assigning a content type to each content member.

External Collection Content

FIG. 27 shows a collection specifier containing special collection content control directives Lines 7-9 for an external source directory and external source file.

The term "external" means that the content is stored outside of the natural collection directory subtree that is rooted at the location of the collection specifier file. For example, the natural collection subtree of FIG. 25 is rooted on Line 2, at the directory "c:\collections\c-mystuff".

External content is useful in practice for sharing content among several collections, or for including files from remote directories into a local collection. For example, third-party source or object files located in remote directories are sometimes required to build local collection products.

One possible solution to this part of the collection content membership problem is to provide a means for including the remote directories in the list of source directories that are searched for content files, as described above.

FIG. 27 Lines 7-9 show three examples of how collection content control directives for external directories interact with source directory lists specified by the product type, such as shown in FIGS. 23-24.

The "memdir" directive on Line 7 specifies a directory that will be searched instead of the product type source directories, thereby overriding and effectively replacing the entire set of product type source file directories. Multiple "memdir" collection content control directives can be provided to create a set of external directories to be searched.

The "memdir-prepend" directive on Line 8 specifies a search directory that should be prepended to the set of normal product type source directories. This directive is used when an external directory has a higher search order precedence than all source directories specified by the product type definition.

The "memdir-append" directive on Line 9 specifies a search directory that should be appended to the set of normal product type source directories. This directive is used when an external directory has a lower search order precedence than all source directories specified by the product type definition.

FIG. 27 Lines 10-12 show three examples of how external file directives interact with source files that are found with directory lists that are specified by the product type.

The "memfile" directive on Line 10 shows an example of how a single remote file could be specified for inclusion in the collection content list. The "memfile" directive specifies that no product search directory lists should be used. Instead, product membership is completely determined by "memfile" directives. This mechanism allows users to completely specify product membership information using "memfile" directives.

The "memfile-prepend" directive on Line 11 prepends the specified file "file.c" to the list of member files found by using normal product search directories. Filenames provided in the directive override duplicate filenames found in search directories. This mechanism enables users to ensure that specific files in directives override the use of same-name files found by search directory methods.

The "memfile-append" directive on Line 12 appends the specified file "file2.c" to the list of member files found by using normal product search directories. Filenames found in search directories override filenames in directive statements. This mechanism enables users to ensure that same-name files found by search directory methods override the use of specific filenames in directive statements.

In operation, Get Collection Information 141 retrieves special directory and filename directive information from collection specifiers via Collection Information Manager Means 111. Get Collection Information 141 returns the retrieved collection information to Get Collection Membership Information Manager 140, which in turn passes the special directive information into Get Product Content List 146 for use in building desired product content lists.

Collection Content Types

FIG. 28 shows a simplified architecture for an Assign Collection Content Types Manager module 150. The main function of this module is to assign content types to collection content members.

Get File Identification Definition Information 151 obtains file identification information such as that shown in FIG. 30, and writes it into a data structure FIG. 15 Line 12 for use by other collection classifier modules.

Identify Collection Content Types 152 uses file identification information FIG. 30 to determine a content type for each file in the collection content list produced earlier by Get Collection Membership Information Manager 140.

Record Collection Content Types 153 writes the assigned content type into a "content-class-entry" data structure FIG. 20 Line 4 for use by other collection classifier modules.

Operation

In operation, Assign Collection Content Types Manager 150 proceeds according to the simplified algorithm shown in FIG. 29.

First, the algorithm builds data structures required for the computation. For example, a data structure might be built to hold the file identification information shown in FIG. 30.

Next, the algorithm calls Get File Identification Definition Information 151 to obtain file identification information FIG. 30 for use in the type assignment process. Information is typically loaded into a simple data structure and returned to the calling module.

Next, the algorithm calls Identify Collection Content Types 152 to determine a content type for each file in the collection content list produced earlier by Get Collection Membership Information Manager 140. File identification information such as that shown in FIG. 30 is used to perform the content type assignment, as follows.

Four methods of content type identification are shown in FIG. 30: exact, suffix, tail, and content. Column 1 specifies one of the four possible match types. Column 2 specifies a match string used by the match type. Column 3 specifies the associated content type.

The exact method proceeds by matching the exact filename of a content member to a match string from Column 2. For example, suppose the exact filename of a content member was "junkfile". In that case, Identify Collection Content Types 152 would find a match between the filename and Line 3 column 2 of FIG. 30. It would therefore assign the associated Column 3 content type of "ignore" to the content entry in FIG. 20 Line 4.

A content type of "ignore" means that the content member can be ignored by subsequent steps of the classification process. In practice, the content entry is usually removed from the collection content list. This is an efficient mechanism for ignoring files that are not interesting to application programs.

The suffix method proceeds by matching the filename suffix string to a match string from Column 2. For example, a filename of "file1.c" would match Line 7 Column 2, and would result in a content type of "c-source".

The tail method proceeds by matching trailing characters of a filename to a match string from Column 2. For example, some text editor programs produce automatic backup files with filenames that are formed by appending a trailing tilde to the original filename. Thus a filename of "file1.c~" would match Line 5 Column 2, and would result in a content type of "ignore". This is an appropriate result, because application programs typically want to work with the original data files, not old backup files.

The content method proceeds by matching the first line of internal file content to a match string from Column 2. This method is appropriate for determining the content type of files that have no external file naming conventions. For example, Unix shell script files can have arbitrary names, and do not usually have consistent filename suffix strings. In these cases, Identify Collection Content Types 152 reads the first line of the internal file content and compares it against a match string from Column 2. Typical Unix csh scripts that contained a first line consisting of "#!/bin/csh" would therefore match Line 6 Column 2, and would result in a content type of "csh".

As each new content type is determined, the content type value is recorded in the associated "content-class-entry" data structure FIG. 20 Line 4 for later use.

The classification process has now constructed a list of content members and their associated content types. The next phase assigns content processing actions.

Special Fileset Types

Sometimes special files within a collection require special, non-standard processing. For example, a few Fortran files out of hundreds might be too large for the compiler code optimization feature. This is an important problem for automated systems, because special cases do exist in practice, and cannot be ignored. Collection special filesets are a solution to this problem.

FIG. 31 shows a collection specifier containing an example fileset specification. The main idea behind a special fileset specification is to explicitly assign a special content type to members of a fileset. Fileset-assigned content types override the normal content type mechanism.

FIG. 31 Lines 7-9 show a fileset specification. Lines 7-8 associate a fileset name "myset" with three special files that belong to the fileset. In this example, three Fortran filenames are associated with the fileset. Line 9 then associates the fileset name "myset" with a special content type "content-no-optimize". In this example, the special content type means that the special files should be compiled with no code optimization.

In operation, Record Special Fileset Types 153 obtains fileset information from collection specifier information that was first obtained by Get Collection Information 141, and records the necessary content types. Importantly, content types assigned by the fileset mechanism override content types assigned by the normal, dynamic file identification mechanism.

Collection Content Actions

FIG. 32 shows a simplified architecture for an Assign Collection Actions Manager module 160. The main function of this module is to assign processing actions to collection, product, and content members in accordance with their collection, product, and content types. That is, types determine processing actions.

Get Content Type Definition Information 161 obtains content type definitions from files such as those shown in FIG. 34, and writes the information into a data structure FIG. 15 Line 13 for later use.

Get Action Type Name Information 162 obtains action type definitions from files such as those shown in FIG. 35, and writes the information into a data structure FIG. 15 Line 14 for later use.

Identify All Action Matches 163 assigns language types and processing actions to content members by using previously assigned content type indicators FIG. 20 Line 4 and content type definition information obtained by Get Content Type Definition Information 161. In addition, Identify All Action Matches 163 identifies appropriate actions for the current collection and its products. Example collection actions are shown in FIG. 21 Lines 8-10. Example product actions are shown in FIG. 22 Lines 12-13.

Record Action Matches 166 writes assigned content language and content action values into a "content-class-entry" data structure FIG. 20 Lines 5-6 for later use. It also further records collection actions FIG. 15 Line 5 and product actions FIG. 19 Line 4 in data structures for later use.

Operation

In operation, Assign Collection Actions Manager module 160 proceeds according to the simplified algorithm shown in FIG. 33.

First, the algorithm builds data structures required to support the computation. In this case, the most important data structures have already been built by earlier algorithms.

Next, the algorithm calls Get Content Type Definition Information 161 to obtain content type definitions from files such as those shown in FIG. 34, and writes the information into a data structure FIG. 15 Line 13 for later use.

In practice, it may be more efficient to load only those content type definitions that are required by the content types present in the collection content list. However, this is an implementation policy decision, and is strongly affected by the particular numbers of content types involved in particular invocation situations. The same analysis holds true for all type definitions.

Next, Get Action Type Name Information 162 is called to obtain action type definitions from files such as those shown in FIG. 35, and writes the information into a data structure FIG. 15 Line 14 for later use.

Next, Identify All Action Matches 163 assigns language types and processing actions to content members by using previously assigned content type indicators FIG. 20 Line 4 and content type definition information obtained by Get Content Type Definition Information 161. It also identifies collection actions and product actions.

To illustrate the action assignment process, suppose that a content member "file1.c" was previously assigned a content type of "c-source" by Assign Collection Content Types Manager 150.

Identify All Action Matches 163 proceeds by first obtaining a content type indicator FIG. 20 Line 4 for the content member. Next, the content type is used as a key into an "index-content-types.tbl" file FIG. 34, and matches Line 2 of the table. Column 2 of Line 2 specifies the filename of the complete content type definition, "content-c.def".

Identify All Action Matches 163 continues by obtaining a complete content type definition for the "c-source" content type. The content type definition information is obtained from a data structure FIG. 15 Line 13, where it was previously stored by Get Content Type Definition Information 161.

Identify All Action Matches 163 continues by extracting language and action indicators FIG. 34 Lines 9-10 from the content type definition, and passing them to Record Action Matches 166 for storing in data structures.

Identify All Action Matches 163 does not need to dynamically determine matches at the collection and product levels. Instead, it simply copies predetermined explicit actions from collection type definitions FIG. 21 Lines 9-10 and product type definitions FIG. 22 Line 13.

Finally, Record All Action Matches 166 writes the obtained language and action indicators into a "content-class-entry" data structure FIG. 20 Lines 5-6 for later use. It also writes out the collection and product actions into appropriate data structures FIG. 15 Line 5, FIG. 19 Line 4, and thereby completes the action assignment process.

Collection Product Actions

Product actions are symbolic actions associated with collection products. For example, program products typically have a "link" product action to link product object files together to form an executable program. Similarly, library products typically have an "archive" product action to archive the library object files into a library file.

Product actions are explicitly defined as part of product type definitions, so collection content classifiers can simply copy the product actions from product type definitions into classification output data structures. No dynamic searching for products in source directories or matching product types to products needs to occur. An example product action in a program product type definition is shown in FIG. 22 Line 13. An example product action in a classification output for a library product type definition is shown in FIG. 42 Line 8.

Collection Actions

Collection actions are symbolic actions associated with whole collections, rather than with particular products or content files. For example, a collection product might have a global "cleanup" action to clean up all products and platforms within the collection, or a global "checkin" action to check in all files within the collection.

Collection actions are explicitly defined as part of collection type definitions, so collection content classifiers can simply copy the collection actions from collection type definitions into classification output data structures. No dynamic searching for collections in source directories or matching collection types to collections needs to occur. Two example collection actions in a collection type definition are shown in FIG. 21 Lines 9-10. The same two example collection actions are shown in FIG. 41 Lines 4-5, as part of the classification output for a collection.

Collection Content Dependencies

FIG. 36 shows a simplified architecture for a Calculate Collection Content Dependencies Manager module 170. The main function of this module is to determine a list of processing dependencies for each file on the collection content list.

Note that a separate dependency list may be required for each different processing action, because different processes can have completely different dependency semantics. In practice, software build order dependencies are satisfactory for most actions.

Get Content Parser Name 171 obtains a parser type and parser name from an action type definition such as shown in FIG. 35 Lines 6-8.

Parse Content For Dependencies 172 performs the required dependency parsing using either an internal or external parser, in accordance with the parser type obtained by Get Parser Name 171. Internal Parser Means 173 is used for parser types of "internal" FIG. 35 Line 7. External Parser Means 174 is used for parser types of "external".

Record Dependency Information 175 records dependency information produced by Parse Content For Dependencies 172 into a "content-class-entry" data structure FIG. 20 Line 7.

Operation

In operation, Calculate Collection Content Dependencies Manager module 170 proceeds according to the simplified algorithm shown in FIG. 37.

First, the algorithm builds data structures required to support the computation. In this case, the most important data structures have already been built by earlier algorithms.

Next, the algorithm treats each content member in the collection content list.

For each content member, the algorithm calls Get Content Parser Name 171 to obtain a parser type and parser name from the action type definition information FIG. 15 Line 14 previously obtained.

The algorithm continues by calling Parse Content For Dependencies 172, which manages the collection of dependency information. In particular, Parse Content For Dependencies 172 uses the parser type to decide whether to call Internal Parser Means 173 or External Parser Means 174 to perform the actual dependency parsing.

In practice, most action types specify the use of an internal parser, because it is straightforward for preferred classifier implementations to support popular content languages. In contrast, the external parser mechanism is provided mostly for new or non-mainstream languages, where it would be inconvenient or costly to add a rarely-used internal parser to an existing classifier implementation. Importantly, the external parser mechanism requires only changes to data files, and does not require changes to the programming code of the existing classifier implementation.

Having decided which type of parser to use based on the parser type, Parse Content For Dependencies calls one of the subordinate modules 173-174 to perform the parsing work, and passes in the specified parser name as an argument to the invocation.

Subordinate modules 173-174 perform the parse, and return dependency information back to Parse Content For Dependencies 172.

Parsing content files for dependency information is a well understood activity in the prior art. Such parsing uses simple text string manipulation techniques known to those with ordinary skill in the art. In addition, many examples can be found within the literature, within text books, and within freeware source code examples on the Internet. Some example freeware implementations of dependency parsers are even several decades old. Therefore no particular parsing algorithms are described here.

External parsers, if used, receive various arguments as part of the parser invocation. One argument could be the name of an input file to parse, and another argument could be the name of an output file. The output file could contain a list of dependencies implied by the contents of the input file. FIG. 38 shows an example of an external parser interface. Lines 2-3 show example parser command invocation lines that contain the names of input and output filenames. Lines 5-8 show an example output file containing dependency information for a C file named "file1.c" that contains three include files as dependencies.

Record Dependency Information 175 records the dependency information in a "content-class-entry" data structure FIG. 20 Line 7.

Finally, all data structures are returned to Collection Content Classifier Manager Means 130, thereby completing the collection content classification process.

Classification information is disseminated by Output Content Classification Information 132 according to implementation and invocation policies, or returned to the calling module or application program that originally called Collection Content Classifier Manager Means 130.

Classification Output Example

FIGS. 39-44 show a consistent round-trip example of collection content classification. FIG. 39 shows a collection tree structure containing various platform dependent and independent source files. FIG. 40 shows the associated collection specifier file, containing two collection products: a program and a library.

Several aspects of the example are worthy of mention.

FIG. 41 shows Part 1 of the classification output information for the collection of FIG. 39. Part 1 emphasizes classification information for the program product.

FIG. 42 shows Part 2 of the classification output information. Part 2 emphasizes classification information for the library product.

Classification output is shown for the "win98" platform, so no "gnulinux2" content files are shown in the classification output.

All pathnames shown are relative to the "win98.plt" platform directory, since a platform directory is normally the current working directory when processing a collection.

FIG. 41 Line 10 shows an example of a product-level action, which behaves exactly like a content type action, except that the action is associated with the product level instead of the content level. In this particular case, the product action is "link", which represents the necessity of linking compiled object programs in order to produce an executable program. Product-level actions are defined by product type definitions, such as shown by FIG. 22 Line 13. Since product actions are already associated with collection products by virtue of being defined in product type definitions, there is no need for a dynamic action assignment manager such as Assign Collection Content Actions Manager 160.

FIG. 41 Lines 11-16 and Lines 17-24 are essentially text representations of "content-class-entry" data structures as shown in FIG. 20. Line 15 shows a content action of "none" because the content member file "cmdline.h" needs no processing actions such as compiling or linking. In contrast, Line 21 shows a content action of "action-c-source", which represents the physical action of compiling the file. Lines 22-23 show that content member "cmdline.c" depends on two include files "cmdline.h" and "libfuns.h".

FIG. 42 Line 8 shows a content action of "archive", which represents the idea of binding compiled object files into a library archive file. Multiple content actions are allowed. For example, Line 9 shows a second content action of "export-lib-for-sharing", which represents the idea of exporting the bound library archive product to a filesystem location where it can be shared (linked to) by programs that want to use the library. Similarly, Line 14 exports the C header file "libfuns.h", which describes the library functions to programs that link to the library.

As can be seen from the foregoing disclosure, collection content classifiers provide a scalable, fully-automated way of classifying collection contents for application programs that must process collections. In addition, the four-level type hierarchy provides a flexible, extensible means for implementing local site content classification policies. Thus collection classifiers provide a very useful service to organizations and application programs that want to process collections automatically.

CONCLUSION

The present Collection Content Classifier invention provides practical solutions to seven important collection content classification problems faced by builders of automated collection processing systems. The problems are: (1) the general collection content classification problem, (2) the collection multiple product problem, (3) the collection content membership problem, (4) the collection special fileset problem, (5) the collection content type assignment problem, (6) the collection action assignment problem, and (7) the collection content dependency problem.

In particular, the preset Collection Content Classifier invention provides answers to the following practical processing questions that must be answered by automated collection processing systems before processing can begin: (1) What products are specified by the collection? (2) What files are in the collection, the products, and the special filesets? (3) What are the content types of the files? (4) What processing actions should be applied to the collection, to the products, to the filesets, and to the content files? (5) What processing dependencies exist among the various content files?

As can be seen from the foregoing disclosure, the present collection content classifier invention provides automated collection processing systems with a practical means for obtaining large amounts of practical collection processing information in a convenient, automated, and scalable way that was not previously available.

RAMIFICATIONS

Although the foregoing descriptions are specific, they should be considered as sample embodiments of the invention, and not as limitations. Those skilled in the art will understand that many other possible ramifications can be imagined without departing from the spirit and scope of the present invention.

General Software Ramifications

The foregoing disclosure has recited particular combinations of program architecture, data structures, and algorithms to describe preferred embodiments. However, those of ordinary skill in the software art can appreciate that many other equivalent software embodiments are possible within the teachings of the present invention.

As one example, data structures have been described here as coherent single data structures for convenience of presentation. But information could also be could be spread across a different set of coherent data structures, or could be split into a plurality of smaller data structures for implementation convenience, without loss of purpose or functionality.

As a second example, particular software architectures have been presented here to more strongly associate primary algorithmic functions with primary modules in the software architectures. However, because software is so flexible, many different associations of algorithmic functionality and module architecture are also possible, without loss of purpose or technical capability. At the under-modularized extreme, all algorithmic functionality could be contained in one software module. At the over-modularized extreme, each tiny algorithmic function could be contained in a separate software module.

As a third example, particular simplified algorithms have been presented here to generally describe the primary algorithmic functions and operations of the invention. However, those skilled in the software art know that other equivalent algorithms are also easily possible. For example, if independent data items are being processed, the algorithmic order of nested loops can be changed, the order of functionally treating items can be changed, and so on.

Those skilled in the software art can appreciate that architectural, algorithmic, and resource tradeoffs are ubiquitous in the software art, and are typically resolved by particular implementation choices made for particular reasons that are important for each implementation at the time of its construction. The architectures, algorithms, and data structures presented above comprise one such conceptual implementation, which was chosen to emphasize conceptual clarity.

From the above, it can be seen that there are many possible equivalent implementations of almost any software architecture or algorithm, regardless of most implementation differences that might exist. Thus when considering algorithmic and functional equivalence, the essential inputs, outputs, associations, and applications of information that truly characterize an algorithm should also be considered. These characteristics are much more fundamental to a software invention than are flexible architectures, simplified algorithms, or particular organizations of data structures.

General Software Ramifications

The foregoing disclosure has recited particular combinations of program architecture, data structures, and algorithms to describe preferred embodiments. However, those of ordinary skill in the software art can appreciate that many other equivalent software embodiments are possible within the teachings of the present invention.

As one example, data structures have been described here as coherent single data structures for convenience of presentation. But information could also be could be spread across a different set of coherent data structures, or could be split into a plurality of smaller data structures for implementation convenience, without loss of purpose or functionality.

As a second example, particular software architectures have been presented here to more strongly associate primary algorithmic functions with primary modules in the software architectures. However, because software is so flexible, many different associations of algorithmic functionality and module architecture are also possible, without loss of purpose or technical capability. At the under-modularized extreme, all algorithmic functionality could be contained in one software module. At the over-modularized extreme, each tiny algorithmic function could be contained in a separate software module.

As a third example, particular simplified algorithms have been presented here to generally describe the primary algorithmic functions and operations of the invention. However, those skilled in the software art know that other equivalent algorithms are also easily possible. For example, if independent data items are being processed, the algorithmic order of nested loops can be changed, the order of functionally treating items can be changed, and so on.

Those skilled in the software art can appreciate that architectural, algorithmic, and resource tradeoffs are ubiquitous in the software art, and are typically resolved by particular implementation choices made for particular reasons that are important for each implementation at the time of its construction. The architectures, algorithms, and data structures presented above comprise one such conceptual implementation, which was chosen to emphasize conceptual clarity.

From the above, it can be seen that there are many possible equivalent implementations of almost any software architecture or algorithm, regardless of most implementation differences that might exist. Thus when considering algorithmic and functional equivalence, the essential inputs, outputs, associations, and applications of information that truly characterize an algorithm should also be considered. These characteristics are much more fundamental to a software invention than are flexible architectures, simplified algorithms, or particular organizations of data structures.

Collection Content Classifier Manager

A collection content classifier can be used in various practical applications.

One possible application is in configuration management systems, which could use a collection content classifier to obtain classification information for collections stored within the configuration management system.

Another possible application is in integrated development environments, which could use a collection content classifier to obtain classification information for collections being worked on by the integrated development system.

Another possible application is in application programs, which could use a collection content classifier to obtain classification information for a collection of interest to the application program.

Functional Enhancements

One possible functional enhancement is to implement a collection content classifier as a standalone program, thereby making it possible to inspect and classify collections outside of the context of any particular application program. Such a program would provide human workers with a means for understanding the contents of large numbers of collections without the need to physically inspect collections manually.

Classification Type Hierarchy

A four-level collection type information hierarchy was presented here, but other organizations of type information are also possible. One example is to use a linear type definition organization such as the one shown in FIG. 10, instead of using a hierarchical organization. Another example is to use a three-level hierarchy that has no action types, or no content types. Another example is to use a five-level hierarchy that supports sub-products of products.

Type definition hierarchies are stored externally outside collection subtrees in preferred implementations, but other implementations are also possible. One example is storing type information internally, within the main collection subtree. Another example is storing type definition information in a collection specifier file. Another example is storing type definition information in a relational database format, either inside or outside the host collection. All of these implementations have various tradeoffs between convenience, flexibility, locality of information, and accessibility for sharing. Particular tradeoff choices would be determined by implementation policy.

Collection Content Lists

In preferred implementations such as those described above, collection content lists are constructed by dynamically searching sets of source directories that are specified by product type definitions. However, other methods of constructing collection membership information are also possible.

One example is to use match expressions to search databases of candidate content search directories or of candidate content filenames. Matched directory names could be used to form sets of search directories. Matched filenames could be used directly as content files.

Another example is to use recursive directory expressions in search directory expressions. Such expressions would specify that whole directory subtrees should be searched for content files, rather than only individual directories, such as shown in FIG. 23.

Another example is to use various search expressions to search for collection content files stored in configuration management systems. In this approach, a set of dynamic search expressions could be used to match files stored in remote systems, so they could be included as collection content members. In other variations of this approach, match expressions could be used to refer to search directories or files on FTP servers, HTTP web servers, or other networked servers, such as shown in FIG. 10 Lines 5-7.

Another example is to use an explicit remote directory to fill the role of the current platform directory. This approach would allow a classifier to classify remote collections without requiring that the current working directory of the classifier computational process be set to a valid platform directory within a collection that is being classified.

Content Types

In preferred implementations such as described earlier, content types are determined using four file identification methods: exact, suffix, tail, and content. However, other methods of determining content types are also possible.

One example is to look up the current content filename in a database that associates whole filenames and content types.

Another example is to use an internal content inspection that goes deeper than the first line of a content file. For example, a parser might parse the entire file to see if the file contents are valid. Then the parser could assign a content type that indicated the validity "c-source-valid" or invalidity "c-source-invalid" of the internal content. This approach embeds a validity indicator directly into the content type, thereby enabling the classifier to assign different processing actions to valid and invalid files of identical base content types.

Simplifications

Various simplifications of preferred implementations are possible.

One example is to omit one or more classification actions where such information is not required by calling application programs. For example, dependency calculation, action assignment, or content type assignment could be omitted for increased performance and simplicity.

Another example is to use less type definition information. This would simplify an implementation, at the cost of reducing the knowledge and capabilities of the underlying classification process.

Another example is to skip the content type assignment step, and assign actions directly from the file identification process. This would simplify an implementation, at the cost of not being able to model content types separately, and at the cost of not being able to share action type definitions among content types.

Finally, another example is to move external type definition information into a collection specifier or other distinguished file within the collection, thereby enabling classifiers and other application programs to use local type definition information without requiring the additional complexity of a set of external type definition files. Instead, a single linear file could be used to hold type definition information required for processing the collection.

As can be seen by one of ordinary skill in the art, many other ramifications are also possible within the teachings of this disclosure. However, all implementations share the same general goal of using type definition information to support the collection content classification process, thereby enabling application programs to process classified content files in automated ways that were not previously possible.

SCOPE

The full scope of the present invention should be determined by the accompanying claims and their legal equivalents, rather than from the examples given in the specification.

I claim:

1. In a computer system having a processor for running an application program, a method of providing classification information associated with a collection comprising:
    automatically determining collection membership information for the collection; and
    automatically assigning content types to collection content files.

2. The method of claim 1 wherein determining collection membership information is based at least in part on collection multiple product specification information.

3. The method of claim 1 wherein determining collection membership information is based at least in part on collection special fileset specification information.

4. The method of claim 1 wherein determining collection membership information is based at least in part on collection content control directives.

5. The method of claim 1 wherein determining collection membership information is based at least in part on collection type definition information.

6. The method of claim 1 wherein determining collection membership information is based at least in part on collection product type definition information.

7. The method of claim 1 wherein determining collection membership information is based at least in part on collection content type definition information.

8. The method of claim 1 further comprising assigning at least one symbolic processing action to at least one collection content file.

9. The method of claim 8 further comprising determining dependency information for at least one collection content file.

10. A computer-readable medium having computer-executable instructions, which, when executed in a computer system having a processor for running an application program, performs a method of classifying a collection comprising:
    receiving a list of collection content members;
    automatically determining content types of the collection content members;
    automatically determining action values of the collection content members; and
    automatically determining interdependencies of the collection content members.

11. The method of claim 10 further comprising building data structures.

12. The method of claim 10 further comprising determining runtime information.

13. The method of claim 10 wherein an action value is determined by using a content type as a key to a table.

14. A system for providing classification information associated with a collection comprising:
    a memory configured to store classification information; and
    a processor, coupled to the memory, configured to:
    determine collection membership information for the collection; and
    assign content types to collection content files.

15. The system of claim 14 wherein the processor is further configured to assign at least one symbolic processing action to at least one collection content file.

16. The system of claim 14 wherein the processor is further configured to determine dependency information for at least one collection content file.

17. A computer program product for providing classification information associated with a collection, the computer program product being embodied in a computer readable medium and comprising computer instructions for:
   automatically determining collection membership information for the collection; and
   automatically assigning content types to collection content files.

18. The computer program product of claim 17 further comprising computer instructions for assigning at least one symbolic processing action to at least one collection content file.

19. The computer program product of claim 17 further comprising computer instructions for determining dependency information for at least one collection content file.

20. The computer program product of claim 17 wherein determining collection membership information is based at least in part on collection special fileset specification information.

21. The computer program product of claim 17 wherein determining collection membership information is based at least in part on collection content control directives.

22. The computer program product of claim 17 wherein determining collection membership information is based at least in part on collection type definition information.

23. The computer program product of claim 17 wherein determining collection membership information is based at least in part on collection product type definition information.

24. The computer program product of claim 17 wherein determining collection membership information is based at least in part on collection content type definition information.

\* \* \* \* \*